(12) United States Patent
Fujiwara

(10) Patent No.: US 9,083,604 B2
(45) Date of Patent: Jul. 14, 2015

(54) INFORMATION PROCESSING APPARATUS, CLIENT MANAGEMENT SYSTEM, AND CLIENT MANAGEMENT METHOD

(71) Applicant: Yuji Fujiwara, Hamura (JP)

(72) Inventor: Yuji Fujiwara, Hamura (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 146 days.

(21) Appl. No.: 13/713,746

(22) Filed: Dec. 13, 2012

(65) Prior Publication Data

US 2013/0246596 A1 Sep. 19, 2013

(30) Foreign Application Priority Data

Mar. 13, 2012 (JP) .................................. 2012-056483

(51) Int. Cl.
*H04L 12/24* (2006.01)
(52) U.S. Cl.
CPC .............. *H04L 41/00* (2013.01); *H04L 41/024* (2013.01); *H04L 41/08* (2013.01)
(58) Field of Classification Search
CPC ....... H04L 41/00; H04L 41/08; H04L 41/024; G06F 9/455
USPC ................................................ 709/223, 217
See application file for complete search history.

(56) References Cited

U.S. PATENT DOCUMENTS 7,448,079 B2    11/2008  Tremain
8,255,893 B2     8/2012  Savva
8,341,270 B2 *  12/2012  Mazzaferri et al. ........... 709/227
8,355,407 B2 *   1/2013  Wookey et al. ................ 370/401
2007/0186212 A1* 8/2007  Mazzaferri et al. ............... 718/1
2008/0059953 A1  3/2008  Savva
2010/0088699 A1  4/2010  Sasaki (Continued)

FOREIGN PATENT DOCUMENTS

JP    2004-503011    1/2004
JP    2008065409     3/2008

(Continued)

OTHER PUBLICATIONS

Takao Kawazoe, Latest Technology of Citrix for Removing Restrictions of Virtualized Desktop Environment, Data Center Perfect Guide (Winter in 2012), Impress Business Media Corporation, Dec. 31, 2011, first edition, pp. 70-71.

(Continued)

*Primary Examiner* — Kristie Shingles
(74) *Attorney, Agent, or Firm* — Blakely Sokoloff Taylor & Zafman LLP

(57) ABSTRACT

According to one embodiment, an apparatus includes a client management module configured to manage first information which correlates with client terminal information, group information, and type information, the client terminal information indicating a client terminal, the group information indicating a group to which the client terminal belongs, and the type information indicating whether the client terminal is a client virtualization terminal that executes a virtual machine or a thin client terminal, a user management module configured to manage second information which correlates with a user account and the group information, and a group management module configured to manage third information, which correlates with the group information and a virtual image file.

6 Claims, 39 Drawing Sheets

(56) References Cited

U.S. PATENT DOCUMENTS

| | | |
|---|---|---|
| 2011/0010420 A1 | 1/2011 | Kagitani |
| 2011/0145817 A1* | 6/2011 | Grzybowski .................. 718/1 |
| 2012/0017215 A1 | 1/2012 | Koshiba |

FOREIGN PATENT DOCUMENTS

| | | |
|---|---|---|
| JP | 2009-217327 | 9/2009 |
| JP | 2010205047 | 9/2010 |
| WO | 2008-117500 A1 | 10/2008 |

OTHER PUBLICATIONS

Hiroaki Yamazaki, Client Virtualization XenDesktop of Citrix Systems Provides Optimum Desktop Environment According to Usage Environment, Encyclopedia of Visualization (Subete Wakaru Series) 2011, Products/Technologies Supporting Cloud, Nikkei Business Publications, Inc., Nov. 15, 2010, pp. 196-203.

Japanese Patent Application No. 2012-056483, First Office Action, mailed May 7, 2014, (with English Translation).

* cited by examiner

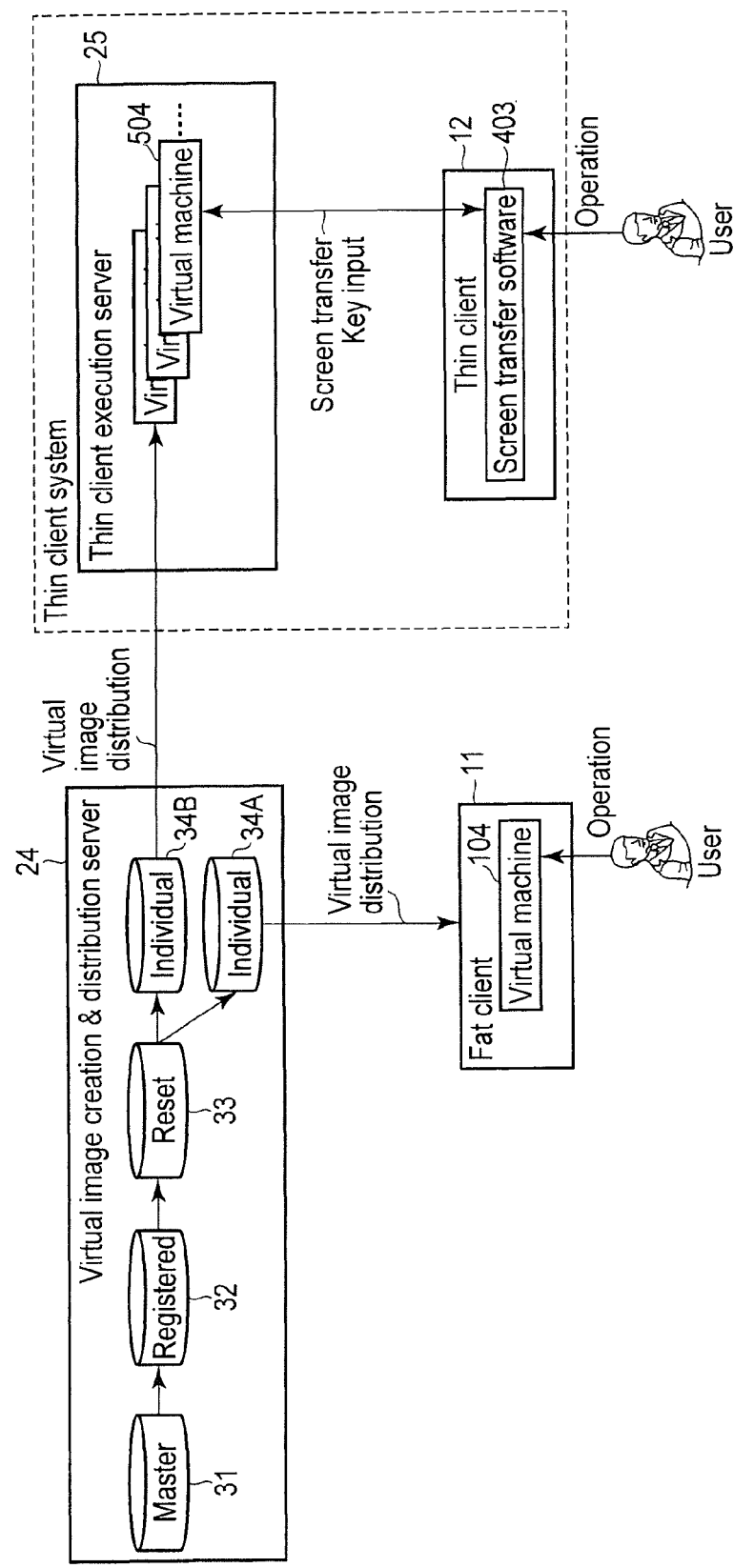
F I G. 1

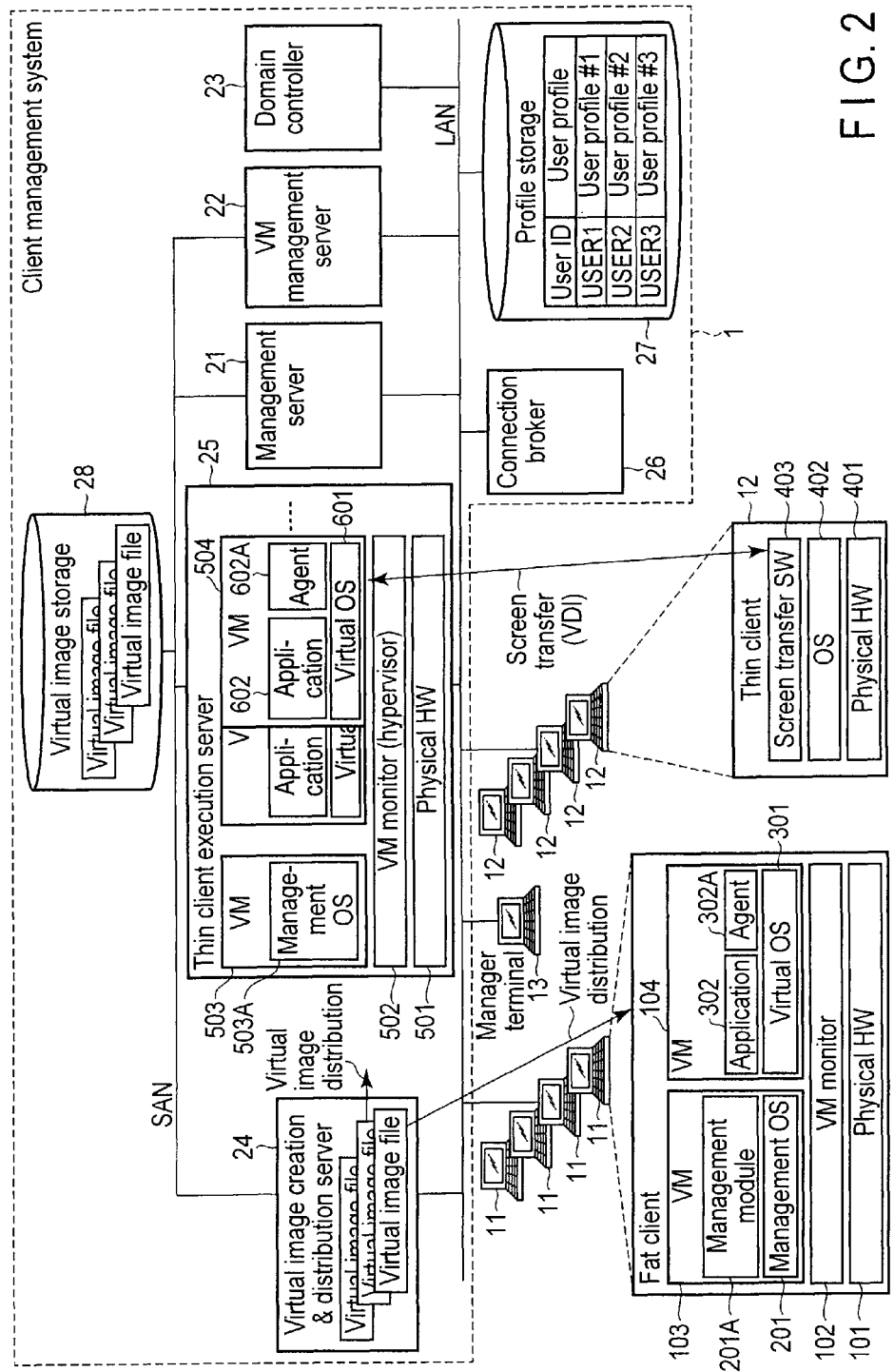
F I G. 2

| Apparatus ID | Computer name | Type name | Assigned group ID | Client type |
|---|---|---|---|---|
| M1 | Computer1# | Hatsushiba notebook RX1 | G1 | Fat client terminal |
| M2 | Computer2# | Hatsushiba notebook L21 | G2 | Fat client terminal |
| M3 | Computer3 | - | G1 | Thin client terminal |
| ... | ... | ... | ... | ... |

F I G. 4

| User account | Assigned group ID |
|---|---|
| Domain1¥user1 | G1 |
| Domain1¥user2 | G2 |
| ... | ... |

F I G. 5

| Group ID | Group name | Virtual image file ID |
|---|---|---|
| G1 | Group1 | I4 |
| G2 | Group2 | I7 |
| ... | ... | ... |

F I G. 6

| Virtual image file ID | Image file name | Type of image file | Parent image file ID | Apparatus ID |
|---|---|---|---|---|
| I1 | Image1 | Master | - | - |
| I2 | Image2 | Registered | - | - |
| I3 | Image3 | Registered | I1 | - |
| I4 | Image3 | Reset | I3 | - |
| I5 | - | Individual | I4 | M1 |
| I6 | - | Individual | I4 | M3 |
| I7 | - | Reset | I2 | |
| I8 | - | Individual | I7 | M2 |
| ... | ... | ... | ... | ... |

F I G. 7

| Type of image file | Explanation |
|---|---|
| Master | Image files being created by manager |
| Registered | Image files determined by manager to be distributed |
| Reset | Difference image files of registered image files, for which reset is executed |
| Individual | Difference image files of reset image files, which are peculiar to respective clients |

F I G. 8

| Management item | Explanation |
|---|---|
| Name of virtual image creation & distribution server | Name for accessing virtual image creation & distribution server |
| Name of connection broker | Name for accessing connection broker |
| Name of virtual machine management server | Name for accessing virtual machine management server |
| Domain information | Information for participating in domain by virtual machine |

F I G. 9

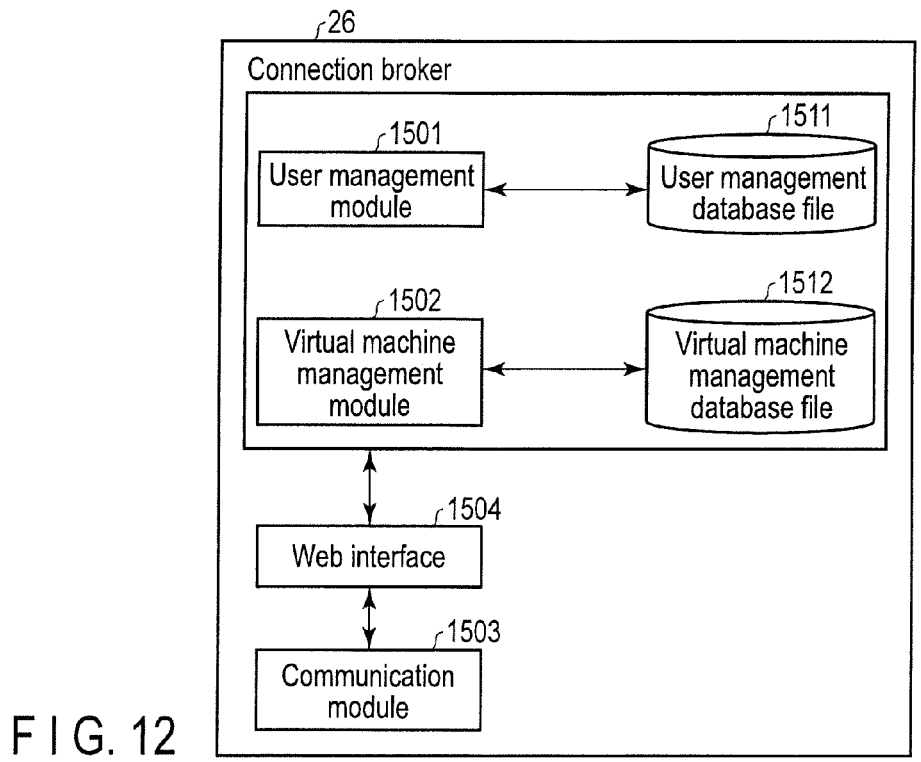

F I G. 12

| User account | User profile path | Usage state | Usable virtual machine list |
|---|---|---|---|
| Domain1\user1 | Server name\...\aaa.vhd | Being used | Virtual machine 1, virtual machine 2,... |
| Domain1\user2 | Server name\...\bbb.vhd | Not used | Virtual machine 2 |
| Domain2\user3 | Server name\...\ccc.vhd | Not used | |
| ... | ... | ... | ... |

F I G. 13

| Virtual machine | Pool virtual machine | Usage state |
|---|---|---|
| Computer3 | Computer3-1 | Being used |
| | Computer3-2 | Not used |
| | ... | ... |
| Computer4 | Computer4-1 | Not used |
| ... | ... | ... |

F I G. 14

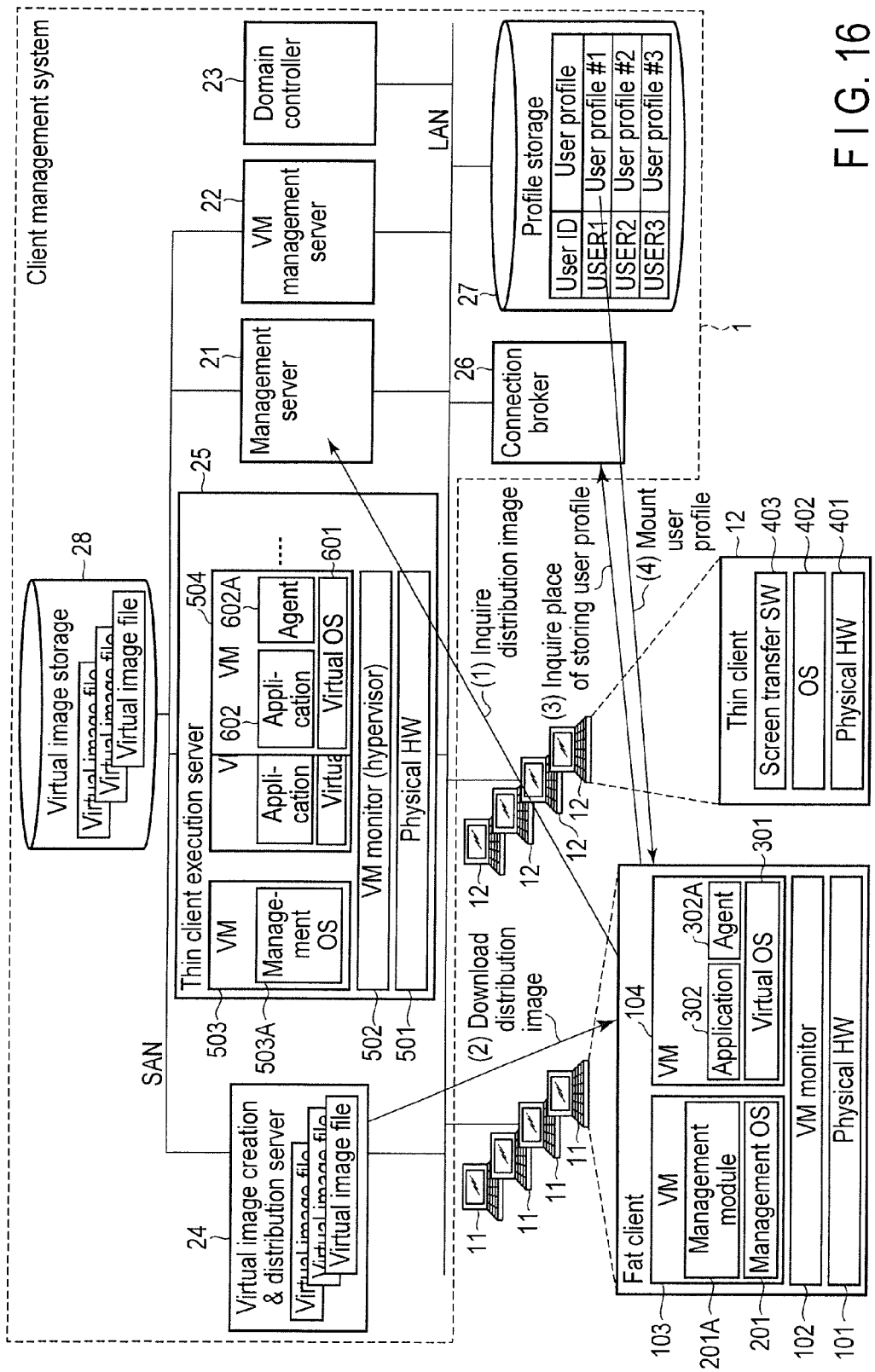
F I G. 16

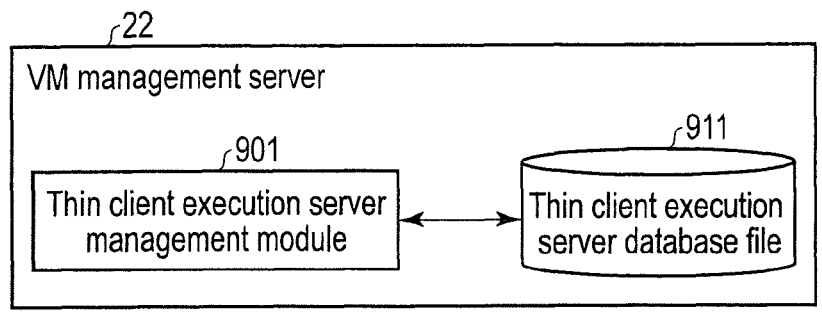
F I G. 18
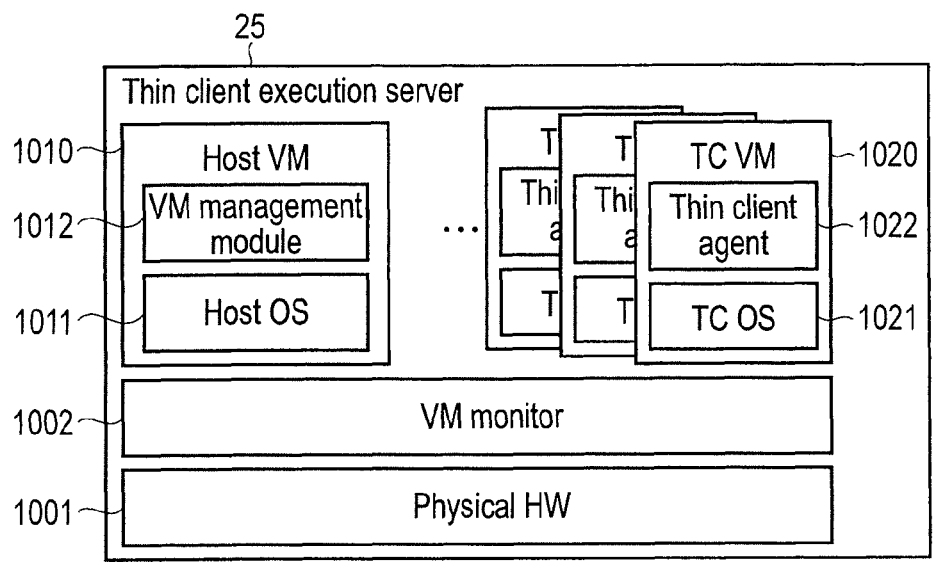
F I G. 19
| Vendor name | Virtual machine management server | Thin client execution server |
|---|---|---|
| Microsoft | SCVMM | Hyper-V server |
| VMware | vCenter | ESX (i) server |
F I G. 20

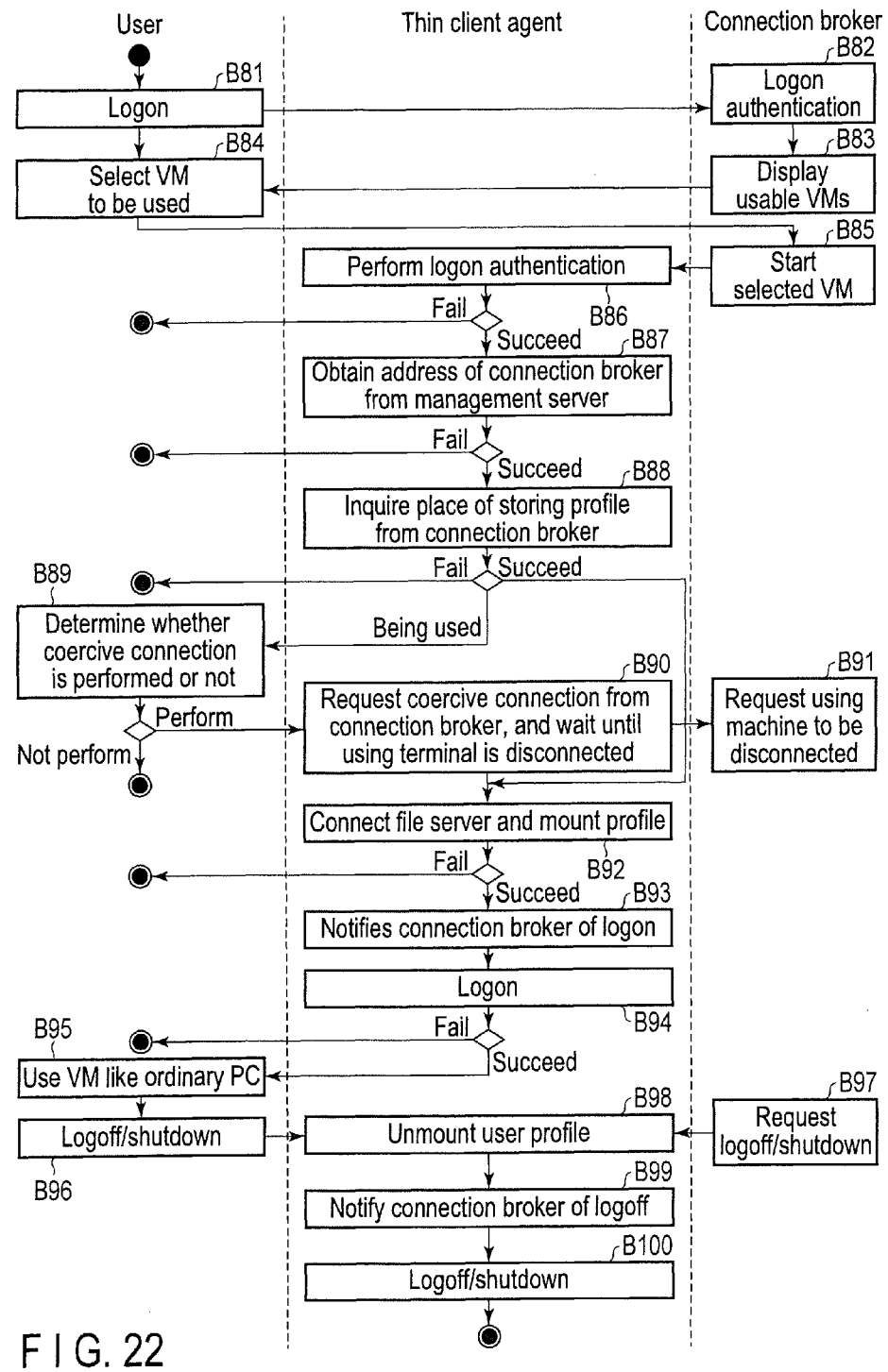
F I G. 22

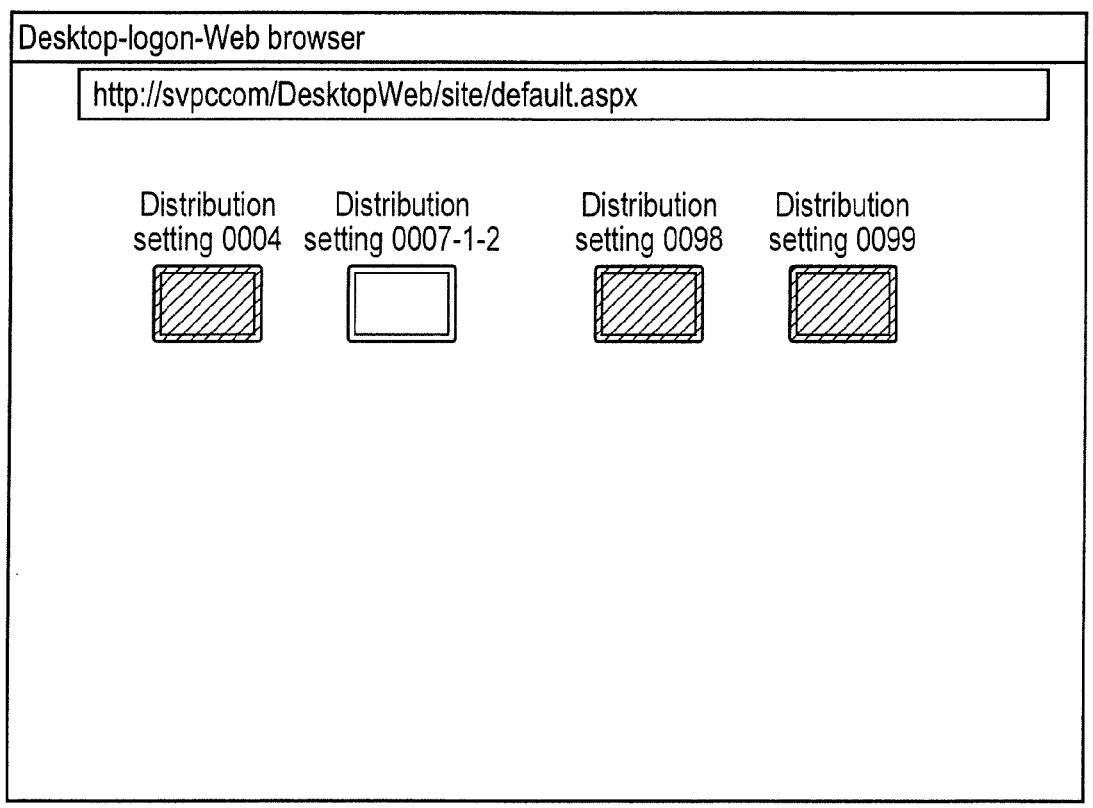
F I G. 24

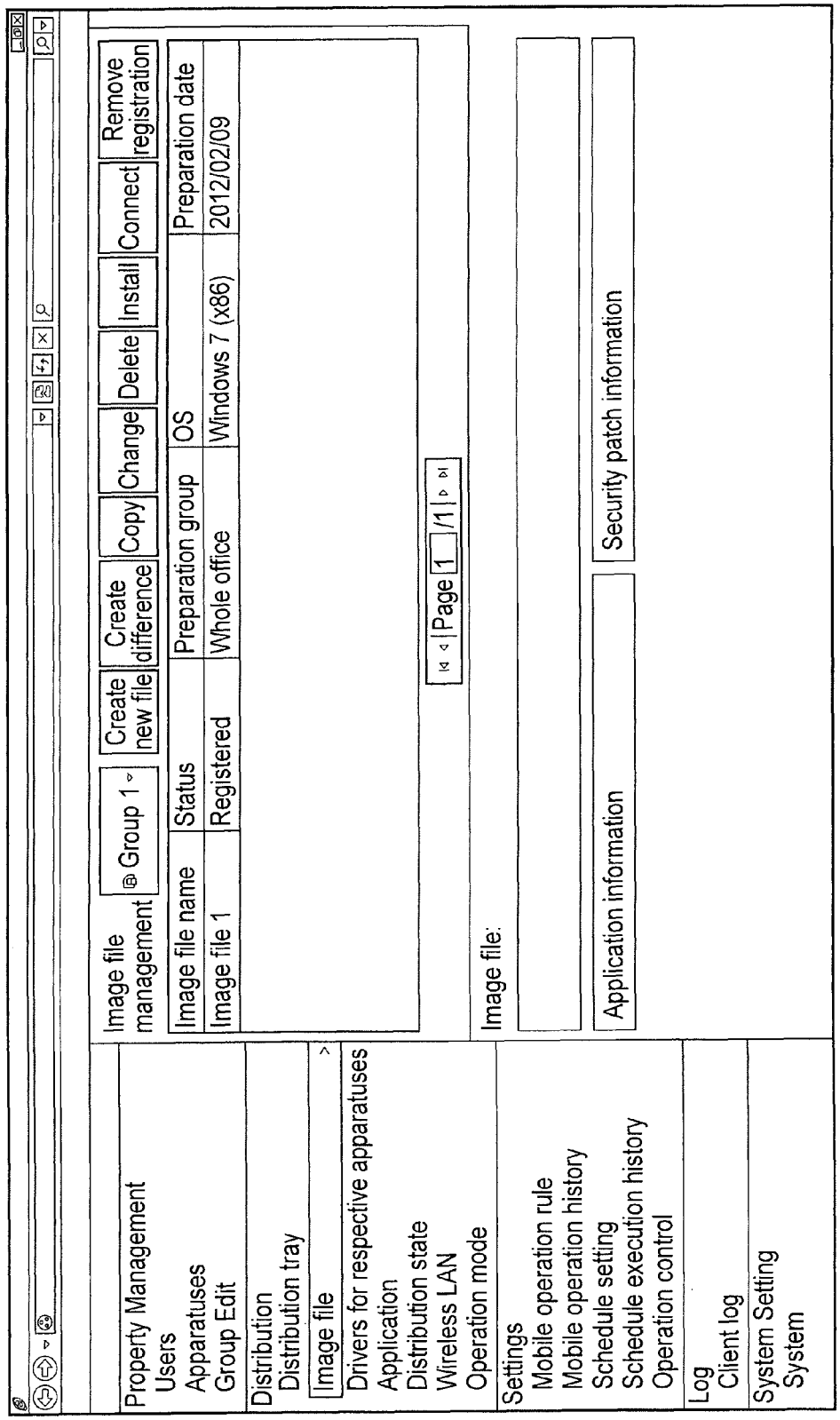
F I G. 33

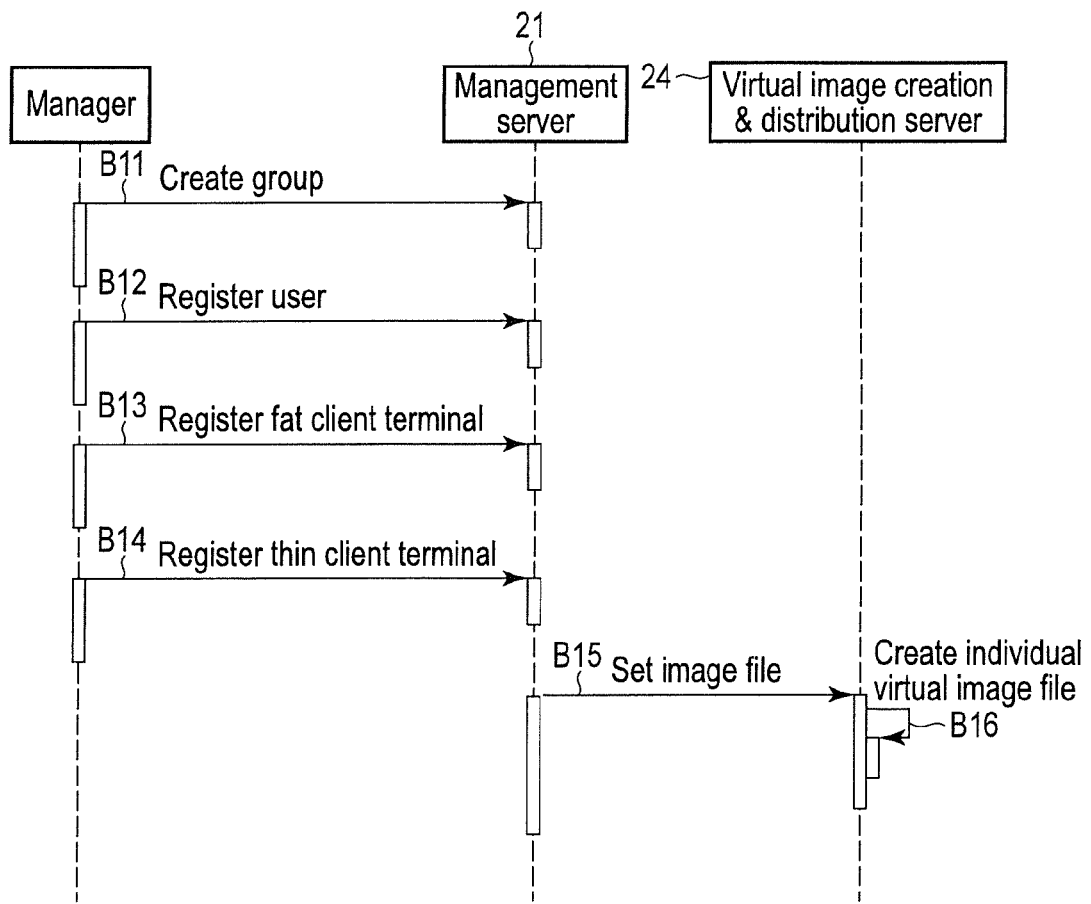
F I G. 35

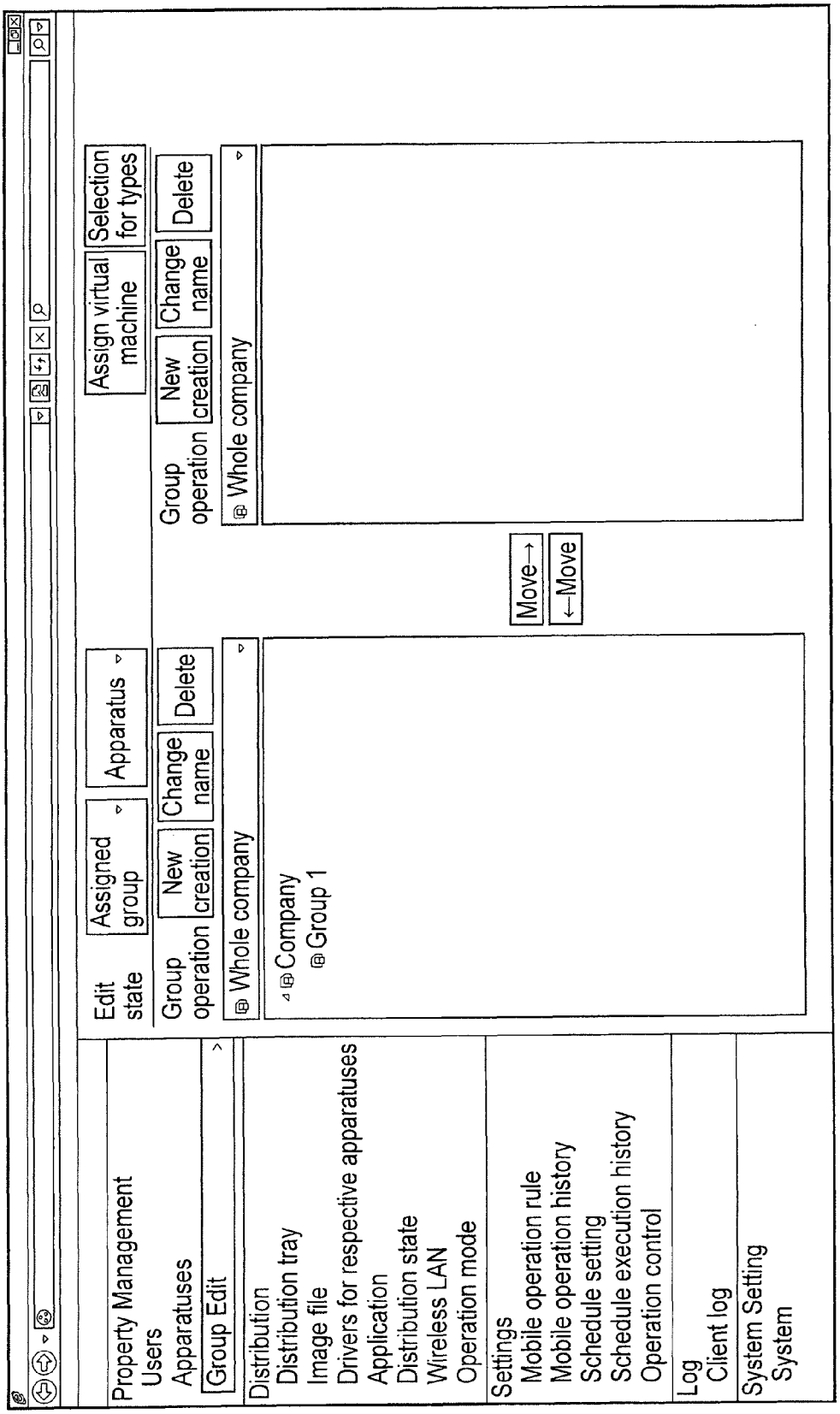
F I G. 38

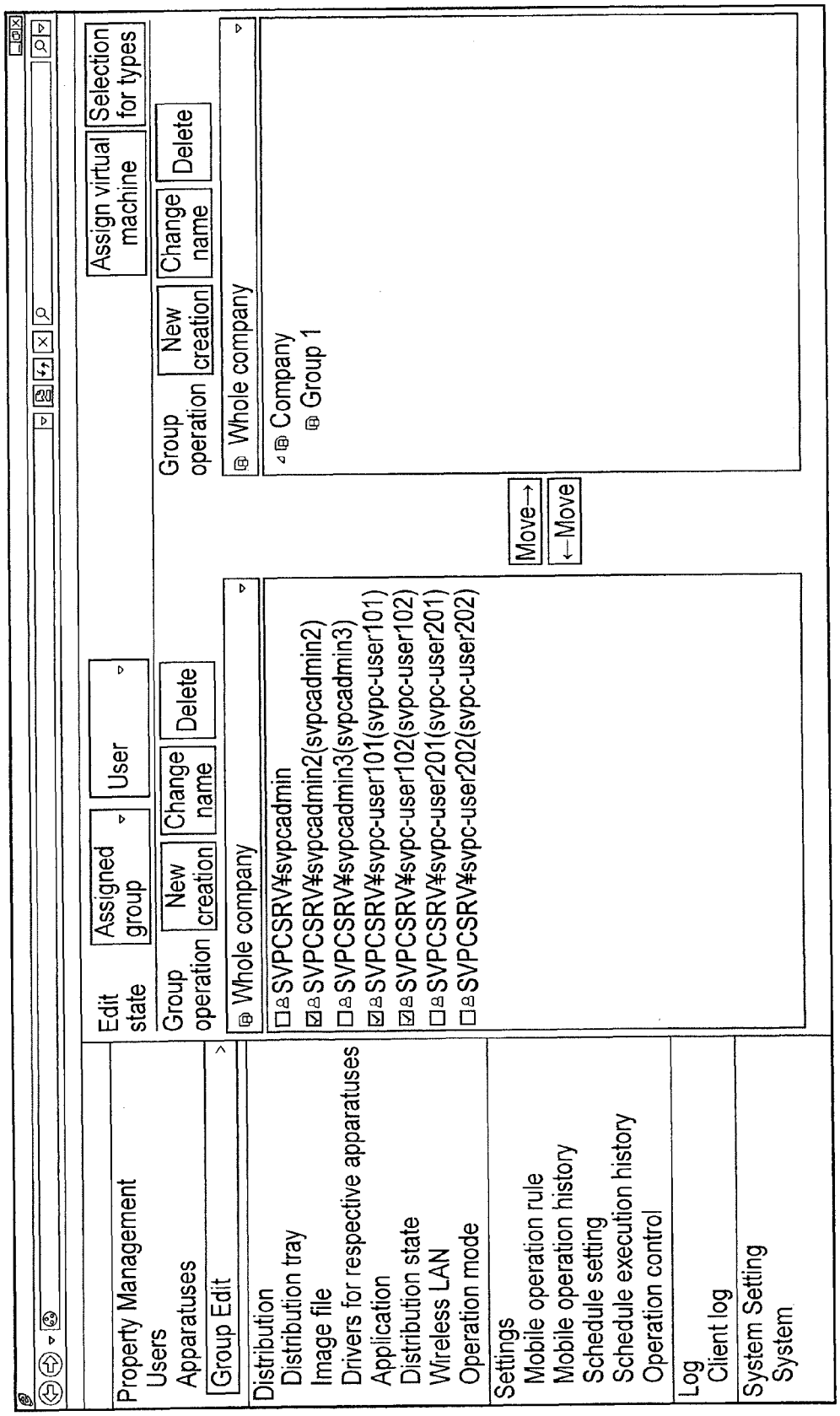
F I G. 40

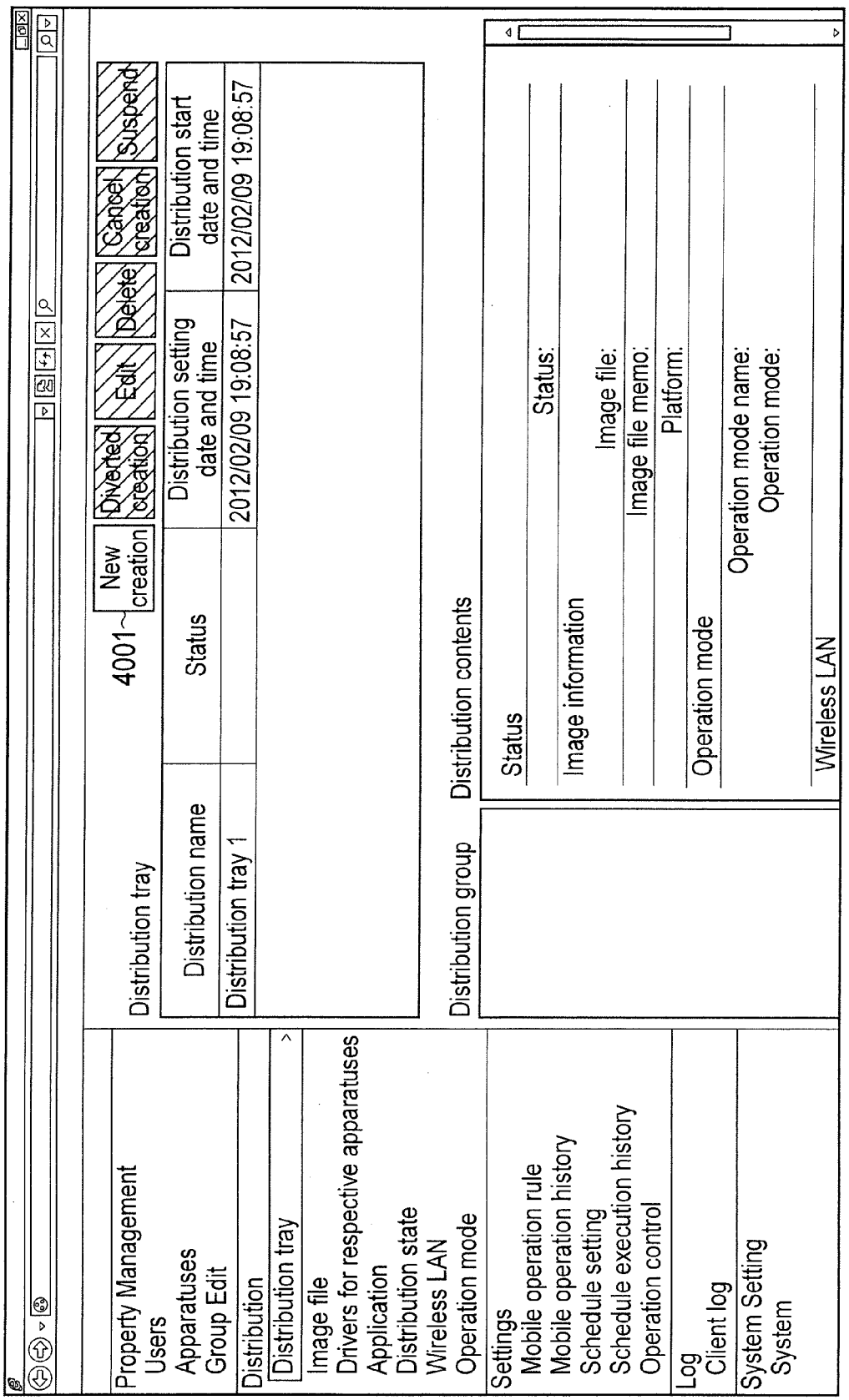
F I G. 42

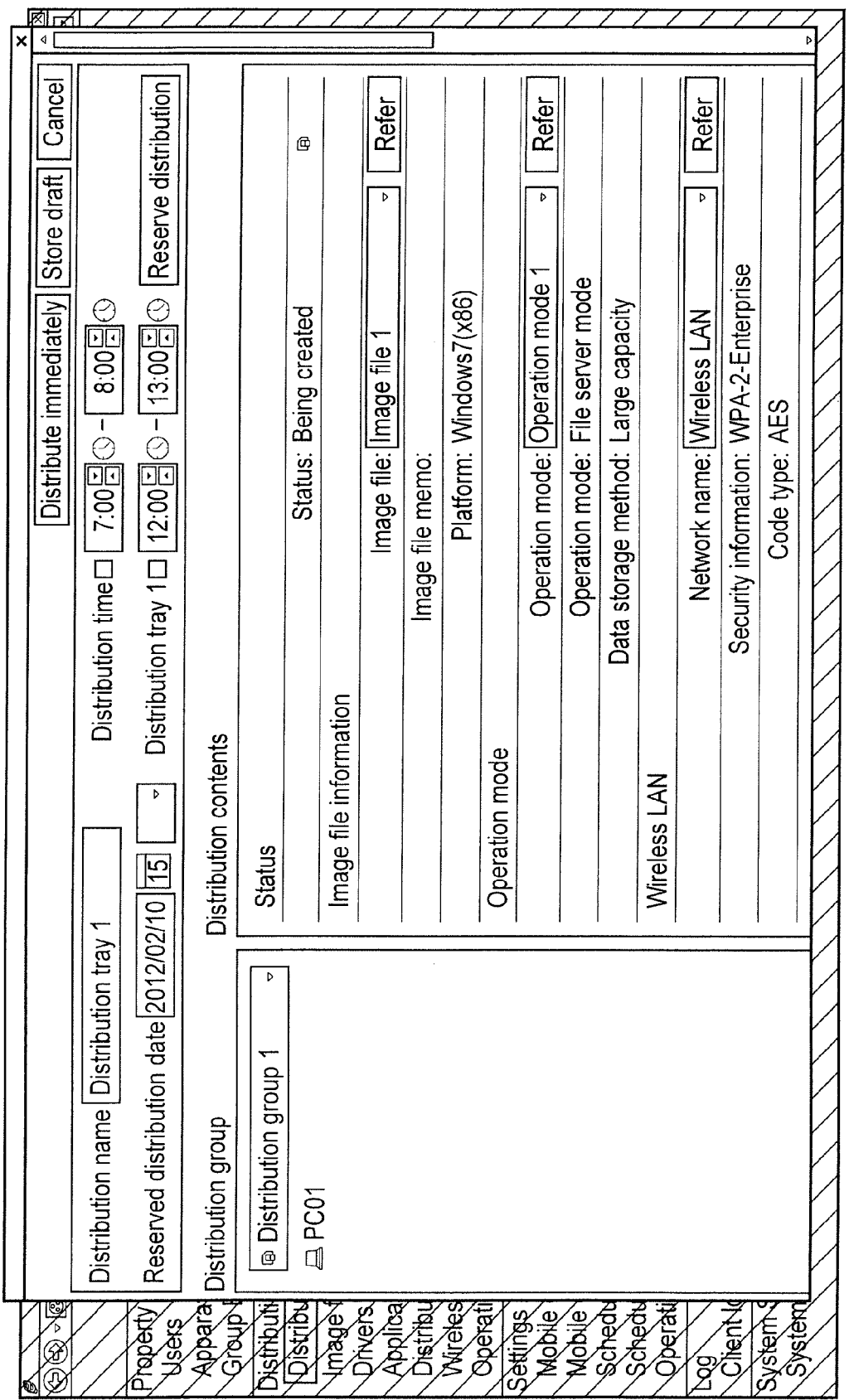
F I G. 43

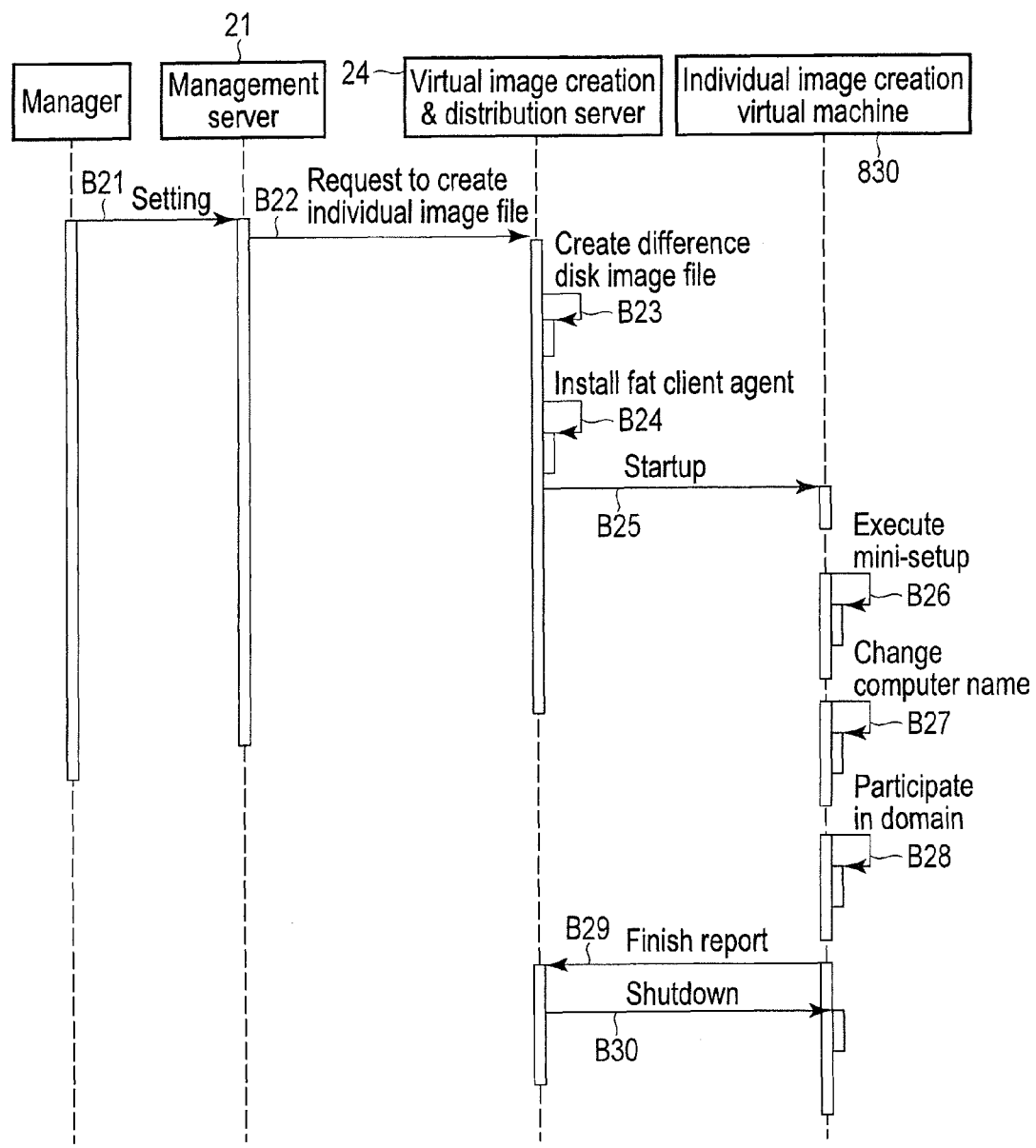
F I G. 44

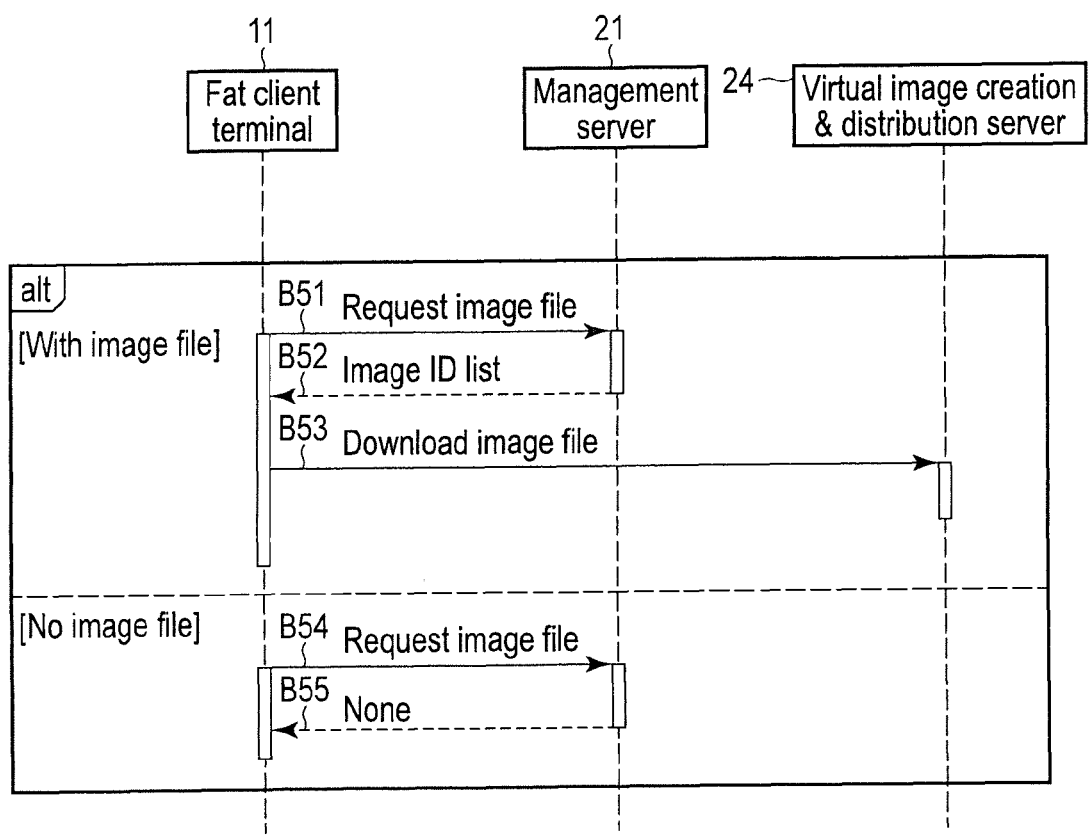
F I G. 45

INFORMATION PROCESSING APPARATUS, CLIENT MANAGEMENT SYSTEM, AND CLIENT MANAGEMENT METHOD

CROSS-REFERENCE TO RELATED APPLICATIONS

This application is based upon and claims the benefit of priority from Japanese Patent Application No. 2012-056483, filed Mar. 13, 2012, the entire contents of which are incorporated herein by reference.

FIELD

Embodiments described herein relate generally to an information processing apparatus, a client management system, and a client management method, to manage client terminals.

BACKGROUND

In recent years, in various companies, introduction of a system (client management system) configured to manage a number of client terminals in the office by a server has been discussed.

In client management systems, desktop environments (operating system, application) of a number of client terminals can be intensively managed by a server in the client management system.

In the meantime, in recent years, it is performed to manage virtual image files to execute virtual machines by client virtualization terminals. There are thin client systems, in which virtual machines are executed by a thin client execution server, and execution results are transmitted to the thin client terminals.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram illustrating a schematic configuration of a client management system according to an embodiment.

FIG. 2 is an exemplary block diagram illustrating a configuration of the client management system according to the embodiment.

FIG. 4 is an exemplary diagram illustrating information which is stored in a client management database file.

FIG. 5 is an exemplary diagram illustrating information which is stored in a user management database file.

FIG. 6 is an exemplary diagram illustrating information which is stored in a group management database file.

FIG. 7 is an exemplary diagram illustrating information which is stored in a virtual image file management database file.

FIG. 8 is an exemplary diagram illustrating types of image files.

FIG. 9 is an exemplary diagram illustrating items which are managed by a system management module.

FIG. 12 is an exemplary diagram illustrating a structure of a connection broker.

FIG. 13 is an exemplary diagram illustrating information which is stored in a user management database file.

FIG. 14 is an exemplary diagram which is stored in a virtual machine management database file.

FIG. 16 is an exemplary diagram for explaining an example of a communication process between the client management system and the fat client terminal (virtualization client terminal) in FIG. 1.

FIG. 18 is an exemplary block diagram illustrating a structure of a virtual machine management server.

FIG. 19 is an exemplary block diagram illustrating a structure of a thin client execution server.

FIG. 20 is an exemplary diagram illustrating the virtual machine management server and the thin client execution server which are commercialized.

FIG. 22 is an exemplary flowchart illustrating a process of logon and logoff/shutdown of the thin client terminal.

FIG. 24 is an exemplary diagram illustrating a virtual machine selection screen which is displayed when authentication with the connection broker has succeeded.

FIG. 33 is an exemplary diagram illustrating an image file management screen which is displayed after the virtual image file is registered.

FIG. 35 is an exemplary flowchart explaining a process of setting virtual image file I4 for group G1.

FIG. 38 is an exemplary diagram illustrating the group edit screen after group registration.

FIG. 40 is an exemplary diagram for explaining registration of user accounts for groups.

FIG. 42 is an exemplary diagram illustrating a distribution tray screen which is displayed by the web browser.

FIG. 43 is an exemplary diagram illustrating an image file selection screen which is displayed by the web browser.

FIG. 44 is an exemplary flowchart illustrating a process of creating an individual image file for the fat client terminal.

FIG. 45 is an exemplary flowchart illustrating a process of inquiring by the fat client terminal of the management server whether there is any new virtual image file.

DETAILED DESCRIPTION

Figure 3:
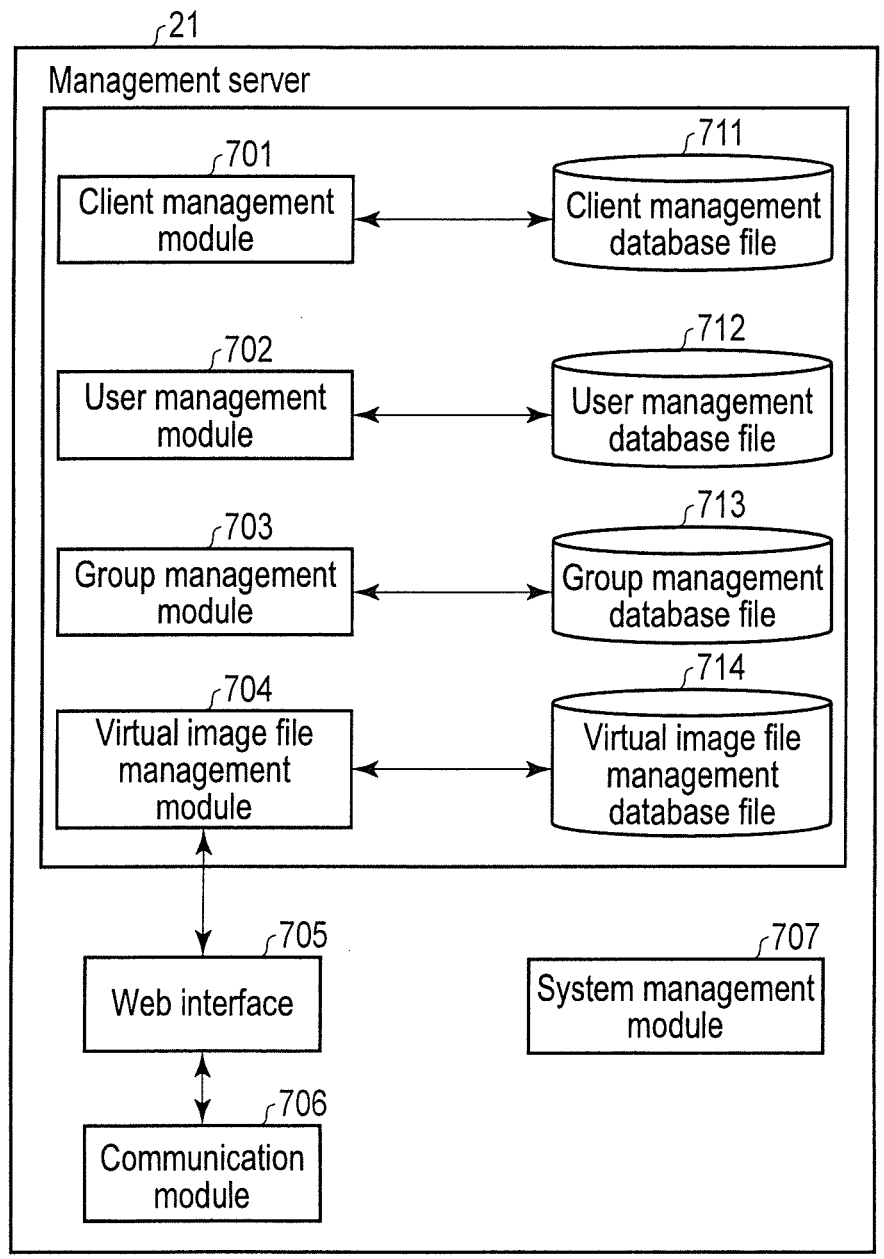
FIG. 3 is an exemplary block diagram illustrating a structure of a management server (information processing apparatus).

Various embodiments will be described hereinafter with reference to the accompanying drawings.

In general, according to one embodiment, an information processing apparatus comprises a client management module, a user management module, and a group management module. A client management module is configured to manage client management information which correlates with client terminal information, group information, and type information. The client terminal information indicates a client terminal. The group information indicates a group to which the client terminal belongs. The type information indicates whether the client terminal is a client virtualization terminal that executes a virtual machine or a thin client terminal. The user management module is configured to manage user management information which correlates with a user account and the group information. The group management module is configured to manage group management information, which correlates with the group information and a virtual image file for executing a virtual machine.

<System Configuration>

FIG. 1 is a diagram illustrating a schematic system configuration of a client management system 1 which includes an information processing apparatus according to an embodiment.

The client management system 1 is a system in which virtual image files that are created by a virtual image creation & distribution server 24 can be distributed to client virtualization terminals and a virtualization host machine of a virtual desktop infrastructure (VDI) system.

The virtual image creation & distribution server 24 creates a master image file 31 which is configured to execute a virtual machine, and in which an operating system is installed. The virtual image creation & distribution server 24 creates a registered image file 32, which is obtained by installing an application program and the like in the master image file 31. The virtual image creation & distribution server 24 creates a reset image file 33, which is obtained by deleting a user profile and the like from the registered image file. The virtual image creation & distribution server 24 creates individual image files 34A and 34B, which are configured to execute virtual machines by terminals, from the reset image file 33.

A client virtualization terminal (fat client) 11 executes a virtual machine 104 by using the image files 31, 32 and 33 and the individual image file 34A. A thin client execution server 25 executes a virtual machine 504 by using the image files 31, 32, and 33, and the individual image file 34B. The thin client execution server 25 can simultaneously execute virtual machines. The user operates the virtual machine by using screen transfer software 403 which uses a screen transfer protocol in a thin client terminal 12.

The present system is a system in which the virtual image files 31, 32, 33, 34A, and 34B that are created by the virtual image creation & distribution server 24 can be distributed to the fat client terminals 11 and the thin client execution server 25 of the virtual desktop infrastructure (VDI) system.

FIG. 2 is a diagram illustrating a whole configuration of the client management system 1 which includes the information processing apparatus according to the embodiment. The client management system 1 is a server system configured to manage client terminals. The client management system 1 can be realized by one or servers (physical server). In this explanation, suppose that the client management system 1 is realized by servers.

As illustrated in FIG. 2, the client management system 1 comprises a management server 21, a virtual machine management server 22, a domain controller 23, the virtual image creation & distribution server 24, the thin client execution server 25, a connection broker 26, a profile storage 27, and a virtual image file storage 28.

The management server 21, the virtual machine management server 22, the domain controller 23, the virtual image creation & distribution server 24, the thin client execution server 25, the connection broker 26, and the profile storage 27 are connected to a network, such as a LAN. A plurality of first-type clients 11 and second-type clients 12 are also connected to the network, such as a LAN.

In addition, the management server 21, the virtual machine management server 22, the virtual image creation & distribution server 24, and the thin client execution server 25 are also connected to the virtual image file storage 28 through another network such as a storage area network (SAN).

The client management system 1 is disposed in, for example, an office. The client management system 1 intensively manages client terminals, which are arranged in the office, by the management server 21. In addition, in the client management system 1, user profiles which are applied to the respective client terminals are stored in the profile storage 27. Each user profile includes setting information for setting a user environment of a client terminal to which the user profile is applied, for example, various setting information relating to application programs, and various setting information relating to the desktop screen. In addition, each user profile also includes user data such as a document file which is created by the user by using an application program.

In the present embodiment, the client management system 1 can manage client terminals of two types, that is, a first type and a second type. Each client terminal 11 illustrated in FIG. 1 is a first-type client terminal. The first-type client terminal is a so-called virtualization client terminal. A virtual machine monitor (hypervisor) is installed as virtualization software in a local storage of each first-type client terminal. Each first-type client terminal executes the virtualization software, and an OS and an application program in a virtual image file which is distributed from the system 1.

Specifically, in each first-type client terminal (hereinafter referred to as a "fat client terminal") 11, a virtual machine monitor 102 is executed on a physical hardware 101 such as a CPU, a memory, storage, and various I/O devices. The virtual machine monitor 102 is virtualization software such as a hypervisor, and functions as a virtualization layer on the physical hardware 101 by emulating resource of the physical hardware 101. Some virtual machines are executed on the virtual machine monitor 102 which is a virtualization layer. In FIG. 2, it is supposed that two virtual machines 103 and 104 are executed on the virtual machine monitor 102. The virtual machine 103 is a virtual machine configured to execute a management OS (host OS) 201. On the other hand, the virtual machine 104 executes a virtual OS (guest OS) 301 and the application program 302 in the virtual image file distributed from the system 1. The virtual machine 104, that is, the virtual OS (guest OS) 301 and the application program 302 operate as a desktop environment of the fat client terminal 11.

The management OS (host OS) can control the virtual machine 104 in cooperation with the virtual machine monitor 102. The management module 201A operates on the management OS (host OS) 201. The management module 201A can download virtual image files from the virtual image creation & distribution server 24 in the system 1. The agent 302A operates on the virtual OS (guest OS) 301. The agent 302A is a program which is executed on the system 1 and the fat client terminal 11.

Second-type client terminals are thin client terminals 12. The thin client terminals 12 communicate with respective virtual machines 504 which are executed on the thin client execution server 25 in the system 1, by using the screen transfer protocol. In other words, the thin client terminals 12 are terminals (base terminals) configured to achieve desktop virtualization by using a virtual desktop infrastructure (VDI) system. Desktop environments (OS, application) of the thin client terminals 12 are managed together by the thin client execution server 25 which is a virtualization server. One of the virtual machines 504 on the thin client execution server 25 is assigned to each thin client terminal 12. The OS and the application are executed by the virtual machine 504 on the thin client execution server 25, not on the thin client terminal 12.

Each thin client terminal 12 transmits input information which corresponds to operation of an input device (such as keyboard and mouse) by the user to a corresponding virtual machine in the thin client execution server 25. Each thin client terminal 12 receives screen information, which reflects the input information, from the corresponding virtual machine in the thin client execution server 25.

Specifically, the screen transfer software 403 is executed in each thin client terminal 12. The screen transfer software 403 is a program which communicates with the virtual machine in the thin client execution server 25 by using the screen transfer protocol. The screen transfer software 403 may be an application program which operates under the OS. In this case, in the thin client terminals 12, an OS 402 is executed on a physical hardware 401 such as a CPU, a memory, and various I/O devices, and the screen transfer software 403 is executed on the OS 402.

Next, components of the client management system 1, the fat client terminals 11, and the thin client terminals will be explained hereinafter.

<Management Server>

The management server 21 is an information processing apparatus of the present embodiment, and a server configured to manage operation of the client management system 1. The management server 21 can execute management of each user who can use the client management system 1, and management of virtual image files which correspond to the respective fat client terminals 11, in response to operation from a manager terminal 13 which is connected to the LAN.

FIG. 3 is a block diagram illustrating a structure of the management server 21 which is the information processing apparatus.

The management server 21 includes a client management module 701, a user management module 702, a group management module 703, a virtual image file management module 704, a communication module 706, a web interface 705, and a system management module 707 and the like.

The client management module 701 manages virtual machines for the fat client terminals and the thin clients, by using a client management database file 711.

FIG. 4 is a diagram illustrating information which is stored in the client management database file 711. The information stored in the client management database file 711 will be explained hereinafter with reference to FIG. 4.

The client management database file 711 includes items "apparatus ID", "computer name", "type name", "assigned group ID", and "client type".

The item "apparatus ID" registers IDs which are assigned to respective apparatuses to distinguish apparatuses (client terminals) in the system and unique to the respective apparatuses.

The item "computer name" registers apparatus names which are assigned to the respective apparatuses. The naming rules of the apparatus name differ according to the type of the apparatus. In the case of the fat client terminals, the apparatus name is formed of the user designated part "ComputerN" (N is an integer) and the automatically-issued number part #. The automatically-issued number part # can have a value from 0 to 9. The item "computer name" is used as a computer name of the virtual machine which is used in the fat client terminal. The part # of the computer name of the virtual machine increases by 1 whenever a virtual machine is created, and changes like 0, 1, . . . , 9, 0, 1 . . . .

When a new image is created, the part # is increased, to prevent the virtual machine which is being used in the fat client terminal at present from overlapping the computer name of the virtual machine created by the virtual image creation server. Since only two virtual machines exist simultaneously, the numbers 0 and 1 may be alternately used.

In the case of the thin client terminals, the virtual machine which is being used is not executed simultaneously with the created virtual machine, and thus the automatically-issued number part # is not used.

The item "type name" registers actual apparatus names, in the case of the fat client terminals. For example, "Product Name" of DMI information is used. The "Product Name" of DMI information indicates "Product Name" (Offset 05h) of SMBIOS Specification System Information (Type 1).

The item "assigned group ID" registers IDs of the groups to which the fat client terminals or the thin client terminals belong. Terminals or machines which belong to the same group can use the virtual image file of the same content, even when their types are different from each other.

The item "client type" registers whether the client terminal is the client virtualization terminal (fat client terminal) or the thin client terminal.

The user management module 702 manages users who use the terminals, by using a user management database file 712.

FIG. 5 is a diagram illustrating information which is stored in the user management database file 712. The information which is stored in the user management database file 712 is explained hereinafter with reference to FIG. 5.

The user management database file 712 is provided with items "user account" and "assigned group ID".

The item "user account" registers accounts which are used by the users for logon. Accounts of the users who use the thin client virtual image files are managed by using the user accounts.

The item "assigned group ID" registers IDs of groups to which the respective users belong. Users who belong to the same group can be the virtual machine of the same content by the thin client terminals.

The group management module 703 manages the groups which are set in the system, by using a group management database file 713.

FIG. 6 is a diagram illustrating information which is stored in the group management database file 713. The information which is stored in the group management database file 713 will be explained hereinafter with reference to FIG. 6.

The group management database file 713 is provided with items such as "group ID", "group name", and "virtual image file ID".

The IDs of the virtual image files which are used in the groups are managed by using the group IDs and the group names. A virtual image file which is changed to a "reset" state by the virtual image creation & distribution server 24 can be designated.

The virtual image file management module 704 manages the virtual image files which are created by the virtual image creation & distribution server 24, by using a virtual image file management database file 714.

FIG. 7 is a diagram illustrating information which is stored in the virtual image file management database file 714. The information which is stored in the virtual image file management database file 714 will be explained hereinafter with reference to FIG. 7.

The virtual image file management database file 714 is provided with items "virtual image file ID", "image file name", "type of image file", "parent image file ID", and "apparatus ID".

The item "virtual image file ID" registers virtual image file IDs which are uniquely assigned by the management server 21.

The item "image file name" registers names which are set for the virtual image file IDs by the manager. The name of the image file, "type of image file" of which is "master" or "registered", is set by the manager. When the "type of the image file" is "master" or "registered", the name of the image file takes over the name of the parent image file, when no name is set for the image file by the manager. When the "type of the image file" is "reset", the image file takes over the name of the "registered" image file.

FIG. 8 is a diagram illustrating types of image files which are registered in the item "type of image file" in the virtual image file management database file 714. The item "type of image file" registers values, each of which indicates one of master image file, reset image file, registered image file, and individual image file illustrated in FIG. 8.

The master image file, type of which is "master", is a virtual image file which is being created by the manager. The file "master image file" is a virtual image file, for which the operating system or the application program is being installed, or user information is being registered. The registered image file, type of which is "registered", is a virtual image file which is determined by the manager to be distributed to the terminal. It is a virtual image file for which installation of the operating system and/or the application program has been completed, and registration of user information has been completed. The reset image file, type of which is "reset", is a difference image file of "registered image file", and a virtual image file obtained by resetting peculiar information for the "registered image file". The reset image file, type of which is "reset", is a virtual image file which is obtained by removing peculiar information, such as user information, from the "registered image file". The operating system and the application program which are installed in the "registered" image file are left in the "reset image file". The individual image file, type of which is "individual", is a difference image file of the "reset image file", and a virtual image file which is peculiar to each client.

FIG. 9 is a diagram illustrating items managed by the system management module 707. As illustrated in FIG. 9, the system management module 707 manages information such as "name of virtual image creation & distribution server", "name of connection broker", "name of virtual machine management server", and "domain information".

The item "name of virtual image creation & distribution server" indicates a name for accessing the virtual image creation & distribution server 24 by the management server 21. The item "name of connection broker" indicates a name for accessing the connection broker 26 by the management server 21. The item "name of the virtual machine management server" indicates a name for accessing the virtual machine management server 22 from the management server 21. The item "domain information" indicates information for participating in the domain by the virtual machine.

<Virtual Image File Creation and Distribution Server>

Figure 10:
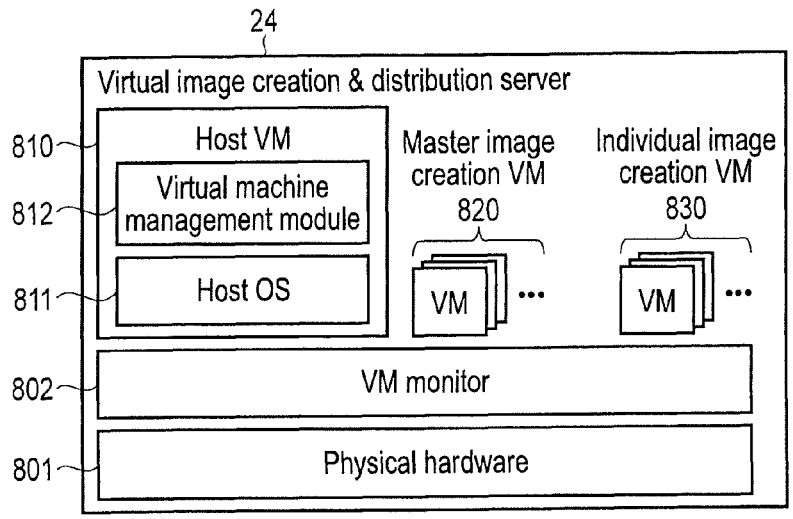
FIG. 10 is an exemplary block diagram illustrating a structure of a virtual image creation & distribution server.

FIG. 10 is a diagram illustrating a structure of the virtual image creation & distribution server 24. The structure of the virtual image creation & distribution server 24 will be explained hereinafter with reference to drawings.

The virtual image creation & distribution server 24 creates two types of virtual machines, that is, master image creation virtual machines 820 and individual image creation virtual machines 830. The master image creation virtual machines 820 deal with "master image file", "registered image file", and "reset image file", among the types of image files illustrated in FIG. 8. The individual image creation virtual machines 830 deal with "individual image file". The number of the master image creation virtual machines and the number of the individual image creation virtual machines can be set by the manager through the management server 21.

It is not always required to create the same number of the virtual machines and the virtual image files. The virtual machines and the virtual image files are managed separately, and a vacant virtual machine is used when a virtual image file is executed. When the virtual machine is completed, the virtual image file is separated from the virtual machine. Specifically, the number of the virtual machines indicates the number of virtual machines which can be simultaneously executed.

Since the master image creation virtual machine is actually operated by the manager, it is necessary to set virtual machines when there are managers or one manager operates master image files simultaneously.

On the other hand, each individual image creation virtual machine is used for creating reset individual image files. The virtual image files are created as illustrated in FIG. 11.

Figure 11:
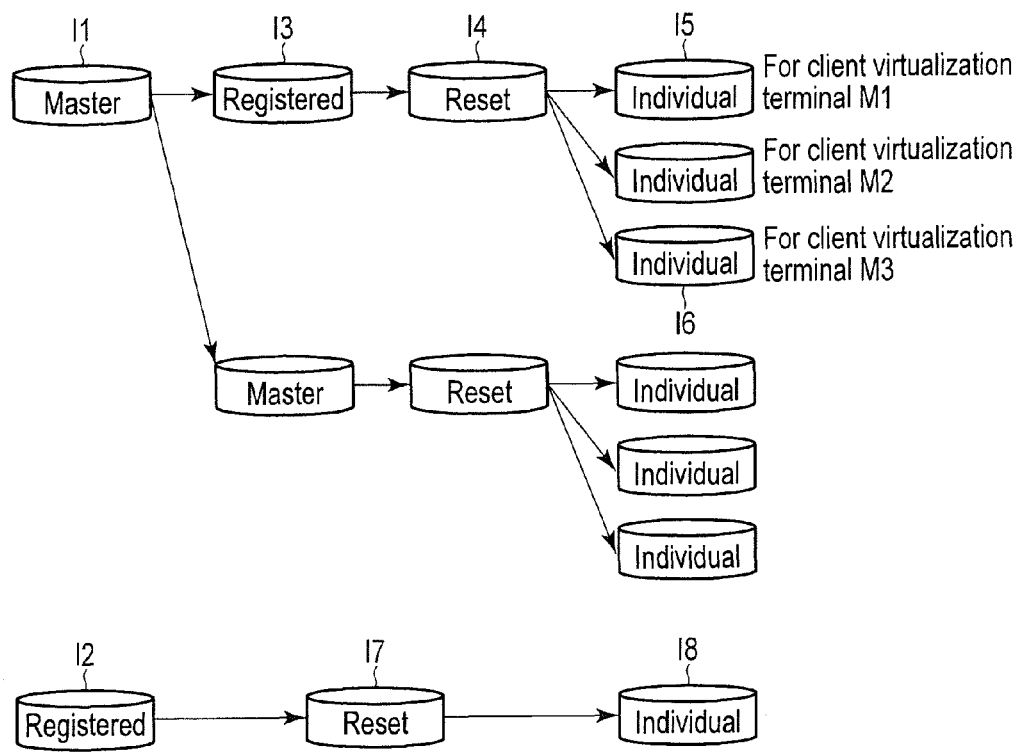
FIG. 11 is an exemplary diagram illustrating process of creating virtual image files.

FIG. 11 is a diagram for explaining a method of creating virtual image files. As illustrated in FIG. 11, generally, individual image files I5 and I6 are created from one master image file I1. In an example of actual use, one master image file is created in an organization, and all the members of the organization use the created master image file. Therefore, when there are twenty members, twenty individual image files are created for one master image file. Although the individual image files are automatically created, when there are a number of virtual machines, creation of the individual image files can be completed earlier, since the virtual machines create individual image files in parallel.

<Connection Broker>

The connection broker 26 is a device which is applied to the client management system 1, to manage the user profiles and the like. The connection broker 26 can be realized by a physical server.

The connection broker 26 manages user profiles, by using the profile storage 27 which stores user profiles that correspond to respective users. The connection broker 26 also has a function of assigning a usable virtual machine on the thin client execution server 25 to a user who has executed a logon operation on the thin client terminal 12. In addition, the connection broker 26 has a function (roaming function) of enabling a user to use the same user environment even when the user performs a logon operation by any client terminal.

FIG. 12 is a block diagram illustrating a structure of the connection broker 26.

The connection broker 26 includes a user management module 1501, a virtual machine management module 1502, a communication module 1503, and a web interface 1504.

The user management module 1501 manages the user account and information of the place of storing the user profile and usage state, by using a user management database file 1511. The user management module 1501 also manages correlation with virtual machines in the thin client execution server, in which the user accounts can be used, by using the user management database file 1511.

FIG. 13 is a diagram illustrating information which is stored in the user management database file 1511. The information which is stored in the user management database file 1511 will be explained hereinafter with reference to FIG. 13. As illustrated in FIG. 13, the user management database file 1511 includes items "user account", "user profile path", "usage state", and "usable virtual machine list".

The item "user account" registers user accounts which are assigned to respective users who use the terminals. The item "user profile path" registers places of storing user profiles for the user accounts, explained later. The item "usage state" registers usage states of the user profiles. The item "usable virtual machine list" registers lists of virtual machines which are allowed to be used for the respective user accounts.

The virtual machine management module 1502 manages pool virtual machines which are derived from base virtual machines, by using a virtual machine management database file 1512.

FIG. 14 is a diagram illustrating information which is stored in the virtual machine management database file 1512. The information which is stored in the virtual machine management database file 1512 will be explained hereinafter with reference to FIG. 14.

As illustrated in FIG. 14, the virtual machine management database file 1512 is provided with items "virtual machine", "pool virtual machine", and "usage state".

The item "virtual machine" registers names of virtual machines which serve as bases of pool virtual machines. The item "pool virtual machine" registers names of pool virtual machines in the thin client execution server 25. The item "usage state" registers usage states of the pool virtual machines.

The fat client terminals 11 and the thin client terminals 12 access the user management module 1501 and the virtual machine management module 1502 through the communication module 1503 and the web interface 1504.

<Profile Storage>

The profile storage 27 stores a number of user profiles which are correlated with a number of identifiers (user ID) of users who can use the system 1. Specifically, the profile storage 27 includes a number of storage places for storing user profiles which correspond to respective users. Suppose that a user performs a logon operation to connect (logon) a client terminal to the system 1, a user profile which is correlated with the user ID of the user is automatically mounted to the file system of the virtual machine that corresponds to the client terminal. For example, in the logon processing of the fat client terminal 11, the user profile which corresponds to the user who has performed the logon operation is mounted on the file system of the virtual machine 104 in the fat client terminal 11. No actual user profile (setting information, user data) exists in the local storage in the fat client terminal 11, but the actual user profile is managed in the system 1. Therefore, it is possible to increase security of the fat client terminal 11.

On the other hand, in a logon operation of the thin client terminal 12, a user profile which is correlated with the user ID of the user who has performed the logon operation is automatically mounted on the file system of the virtual machine 504 in the thin client execution server 25 which corresponds to the thin client terminal 12.

Thereby, a user can use the same user environment (the same user profile), by using either of the fat client terminal 11 and the thin client terminal 12.

Figure 15:
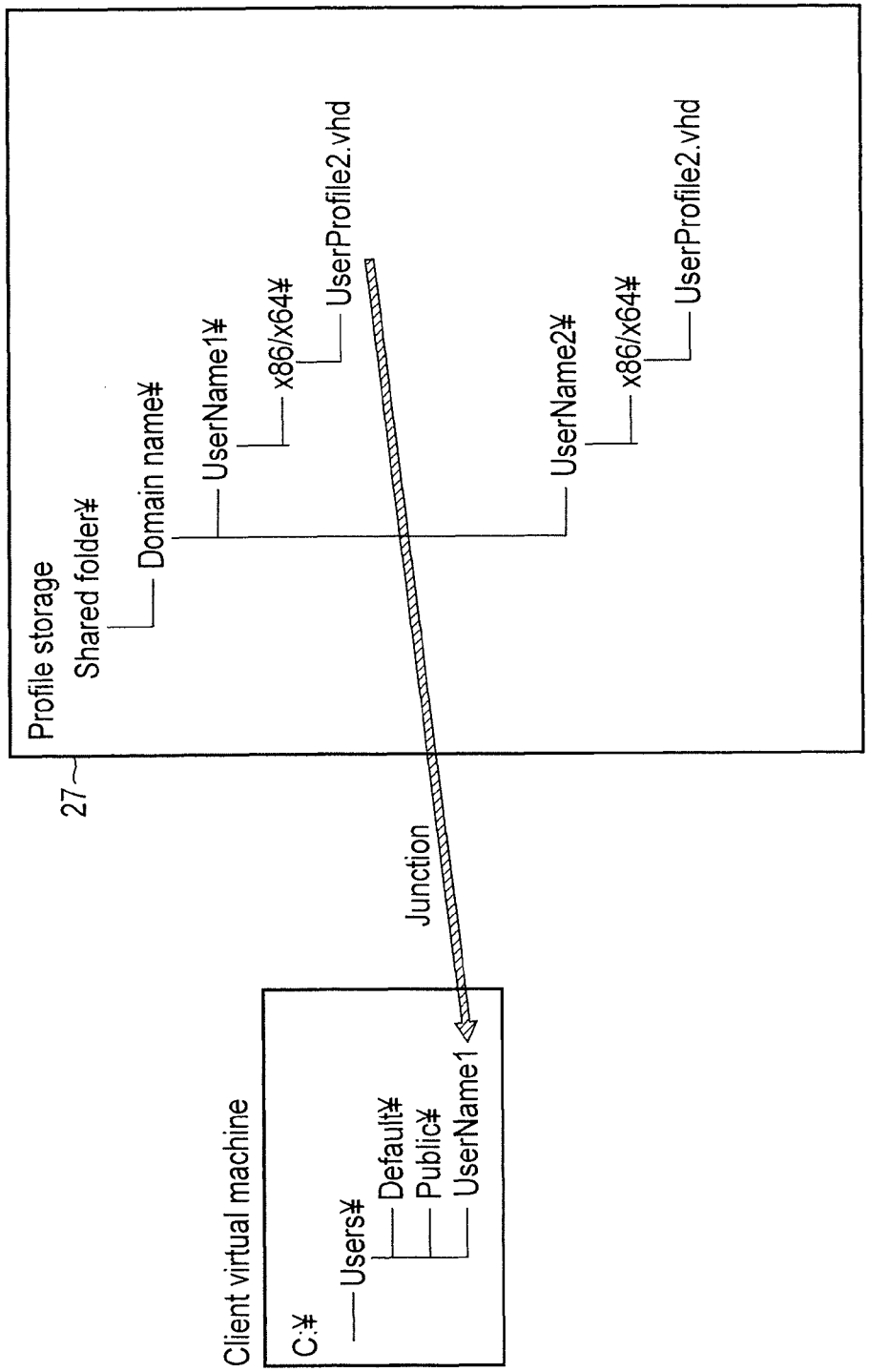
FIG. 15 is an exemplary diagram for explaining user profiles managed by the connection broker.

FIG. 15 is a diagram for explaining user profile managed by the connection broker. User profiles are managed on the profile storage 27. As illustrated in FIG. 15, the terminal can use a disk image file which stores the user profile in the profile storage 27, by creating a junction point to access the disk image file which stores the user profile in the profile storage, as "C:/Users/%UserName%".

<Virtual Image File Storage>

The virtual image file storage 28 is storage configured to store virtual image files created by the virtual image creation & distribution server 24. Both of the profile storage 27 and the virtual image file storage 28 may be realized by storages in a file server (not shown) in the system 1.

<Fat Client Terminal>

The virtual machine monitor operates in the fat client terminal. The term "fat client terminal" indicates a terminal in which a virtual image file created by the virtual image creation server can be operated. The term "fat client terminal" indicates a terminal obtained by installing a virtual machine monitor and a virtual machine management module in an ordinary PC.

Next, the operation sequence of the fat client terminal 11 will be explained.

Figure 17:
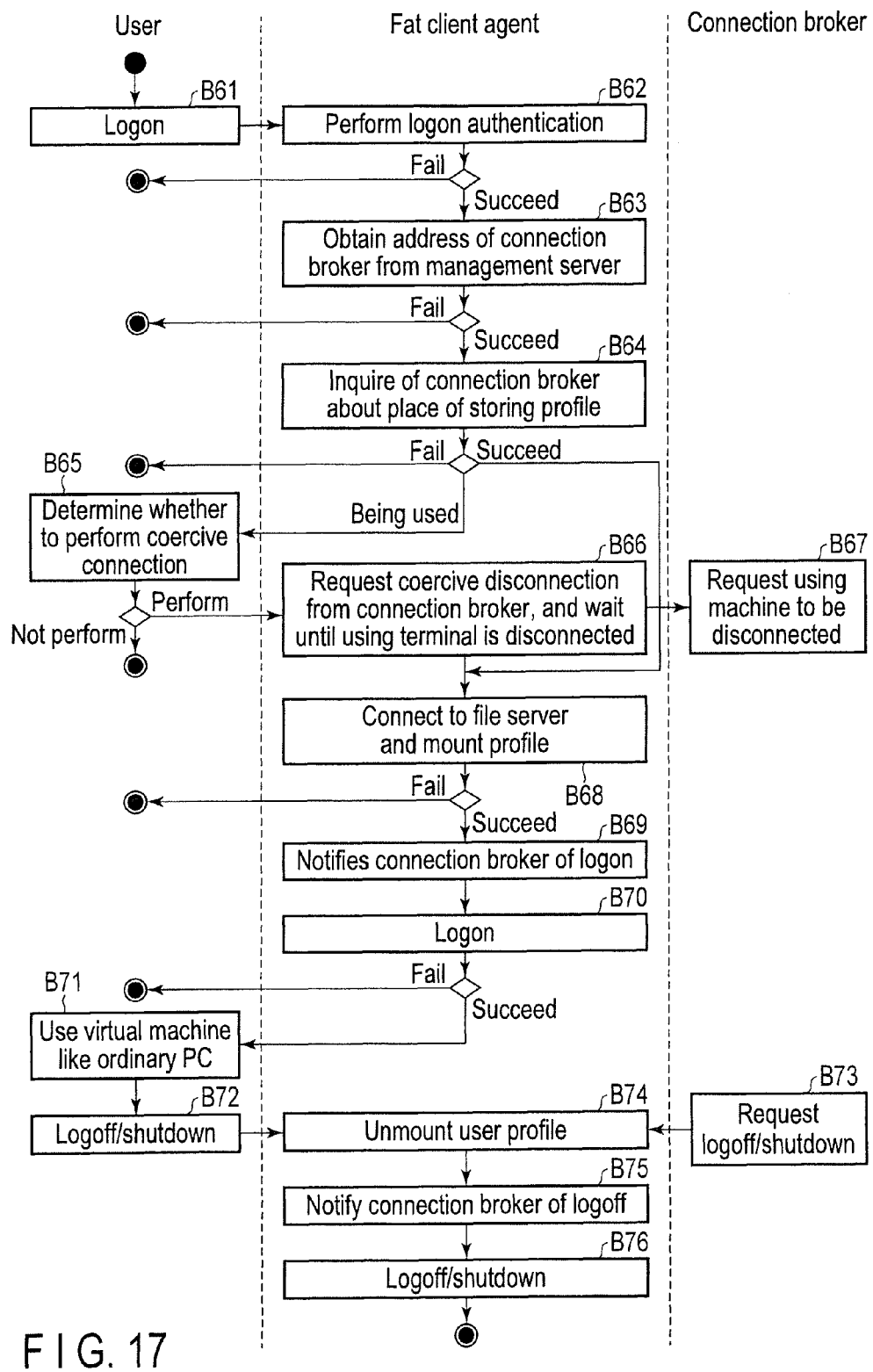
FIG. 17 is an exemplary flowchart illustrating a process of logon and logoff/shutdown of the fat client terminal.

FIG. 16 is a diagram illustrating the operation sequence of a communication process between the client management system and the fat client terminal 11 (virtualization client terminal). FIG. 17 is a flowchart illustrating a process of logon and logoff/shutdown of the fat client terminal. (1) The management module 201A or the agent 302A in the fat client terminal 11 inquires of the management server 21 whether there is any distribution image file (virtual image file) to be applied to the fat client terminal 11. For example, when no virtual image file exists in the local storage of the fat client terminal 11, or an updated virtual image file which corresponds to the virtual image file which has already been distributed to the fat client terminal 11 exists in the system 1, the management server 21 notifies the management module 201A or the agent 302A of an identifier of the virtual image file to be downloaded.

(2) The management module 201A or the agent 302A requests the virtual image file which has the notified identifier from the virtual image creation & distribution server 24, and downloads the virtual image file from the virtual image creation & distribution server 24. The OS (virtual OS) 301 in the downloaded virtual image file is started by rebooting the fat client terminal 11.

(3) A logon screen is displayed by the virtual OS 301. The user inputs the user account and the password to the logon screen, and performs a logon operation on the logon screen (Step B61). The agent 302A performs logon authentication (Step B62). When the logon is authenticated, the fat client agent 302A obtains an address of the connection broker 26 from the management server 21 (Step B63).

When obtaining the address succeeds, the agent 302A transmits a connection request to the connection broker 26, and inquires of the connection broker 26 about the place of storing the user profile which corresponds to the user who has performed the logon operation (Step B64). The connection request is a request to connect (logon) the fat client terminal 11 to the system 1, and includes a user account (user ID) of the user who has performed the logon operation. The user ID is an identifier configured to uniquely identify the user. The connection broker 26 determines whether the transmitted user account exists in the user management database file 1511. When it is determined that the transmitted user account does not exist in the user management database file 1511, the connection broker 26 notifies the fat client agent 302A of it. When the transmitted user account exists in the database file, the connection broker 26 determines whether the user profile for the user account is being used or not, based on the user management database file 1511. When it is determined that the user profile is not being used, the connection broker 26 notifies the virtual machine 104 (agent 302A) of information which indicates a path to the storage place in the profile storage 27, which stores the user profile that is correlated with the user ID of the user, that is, a storage path, and that the user profile is not being used.

When it is determined that the user profile is being used, the connection broker 26 notifies the agent 302A of the storage path and that the user profile is being used. When the agent 302A is notified that the user profile is being used, the fat client agent 302A inquires of the user whether to coercively connect to the disk image file (Step B65). When the user selects coercive connection, the fat client agent 302A requests coercive connection from the connection broker 26, and waits until the terminal which is using the disk image file is disconnected from the disk image file (Step B66). The connection broker 26 requests the terminal which is using the disk image file to be disconnected from the disk image file (Step B67).

(4) When it is notified that the user profile is not being used or the user profile which is being used is unmounted, the virtual machine 104 (agent 302A) mounts the above user profile in the profile storage 27, that is, the above first storage place, on the file system of the virtual machine 104 (virtual OS 301) (Step B68). Thereafter, the virtual machine 104 accesses the first storage place in the profile storage 27, not the local storage of the fat client terminal 11, to perform reading and writing from and in the user profile. When mount succeeded, the fat client agent 302A notifies the connection broker 26 of the user account and logon (Step B69). The connection broker 26 changes the usage state for the user account in the user management database file 1511 to "being used". The virtual OS 301 performs user authentication in cooperation with the domain controller 23 (Step B70). When logon succeeds, the user uses the virtual machine in the same manner as an ordinary personal computer (PC) (Step B71).

When the user requests logoff or shutdown (Step B72), or the connection broker 26 requests logoff or shutdown (Step B73), the fat client agent 302A unmounts the disk image file which stores the profile (Step B74). The fat client agent notifies the connection broker 26 of the user account and logoff (Step B75). The connection broker changes the usage state for the user account in the user management database file 1511 to "Not used". After the notification, the fat client agent 302A logs off or shuts down the virtual OS 301 (Step B76).

<Virtual Machine Management Server>

The virtual machine management server 22 is a server configured to manage the thin client execution server 25. The domain controller 23 is a server configured to authenticate the users and the client terminals. The virtual image creation & distribution server 24 functions as a distribution server which distributes virtual image files, each of which includes an OS and an application program, to fat client terminals 11. The virtual image creation & distribution server 24 can create not only virtual image files for the fat client terminals 11, but also virtual image files for the thin client terminals 12. The virtual image files for the fat client terminals 11 are distributed to the fat client terminals 11. On the other hand, the virtual image files for the thin client terminals 12 are distributed to the thin client execution server 25. Each virtual image file is, for example, a disk image file of virtual hard disk (VHD) format.

FIG. 18 is a block diagram illustrating a structure of the virtual machine management server 22.

As illustrated in FIG. 18, the virtual machine management server 22 includes a thin client execution server management module 901 which manages the thin client execution server. The thin client execution server management module 901 manages the thin client execution server 25 by using a thin client execution server management database file 911.

<Thin Client Execution Server>

The thin client execution server 25 is a server which executes virtual machines for communicating with thin client terminals 12 by using the screen transfer protocol. The thin client execution server 25 may be realized by one physical server which is virtualized by a server virtualization technique.

In the thin client execution server 25, a virtual machine monitor 502 is executed on physical hardware 501 such as a CPU, a memory, storage, and various I/O devices. The virtual machine monitor 502 is virtualization software such as a hypervisor, and functions as a virtualization layer on the physical hardware 501, by emulating resource of the physical hardware 501. A virtual machine 503 for management and virtual machines 504 configured to execute virtual desktop environments are executed on the virtual machine monitor 502. The virtual machine 503 executes a management OS (host OS) 503A. On the other hand, each virtual machine 504 executes a virtual OS (guest OS) 601 and an application program 602 in the virtual image file which is distributed from the virtual image creation & distribution server 24.

The management OS (host OS) 503 can control each virtual machine 504 in cooperation with the virtual machine monitor 502. An agent 602A operates on the virtual OS (guest OS) 601. The agent 602A is a program which executes processing of causing the system 1 to cooperate with each thin client terminal 12, like the agent 302A in the virtual machine 104 of each fat client terminal 11.

FIG. 19 is a block diagram illustrating a structure of the thin client execution server 25. The thin client execution server 25 can execute a number of virtual machines for the thin client terminals 12. The users operate the virtual machines by using the application which uses the screen transfer protocol in the thin client terminals. FIG. 20 illustrates products of typical vendors.

FIG. 20 is a diagram illustrating commercialized virtual machine management servers and thin client execution servers. As illustrated in FIG. 20, Microsoft (Registered Trademark) Corporation provides System Center Virtual Machine Manager (SCVMM) as the virtual machine management server 22, and Hyper-V server as the thin client execution server. VMware (Registered Trademark), Inc. provides vCenter as the virtual machine management server 22, and ESX (i) server as the thin client execution server.

<Thin Client Terminal>

The screen transfer software of each thin client terminal 12 connects to the virtual machine 504, which is executed in the thin client execution server 25, by the screen transfer protocol (such as Citrix ICA, RDP, and Vmware PcoIP), and the user operates the virtual machine 504 executed in the thin client execution server 25.

The term "thin client terminal" indicates not only a thin client terminal, but also a PC which uses the virtual machine in the thin client execution server 25 by VDI.

Next, the operation sequence of each thin client terminal 12 will be explained.

Figure 21:
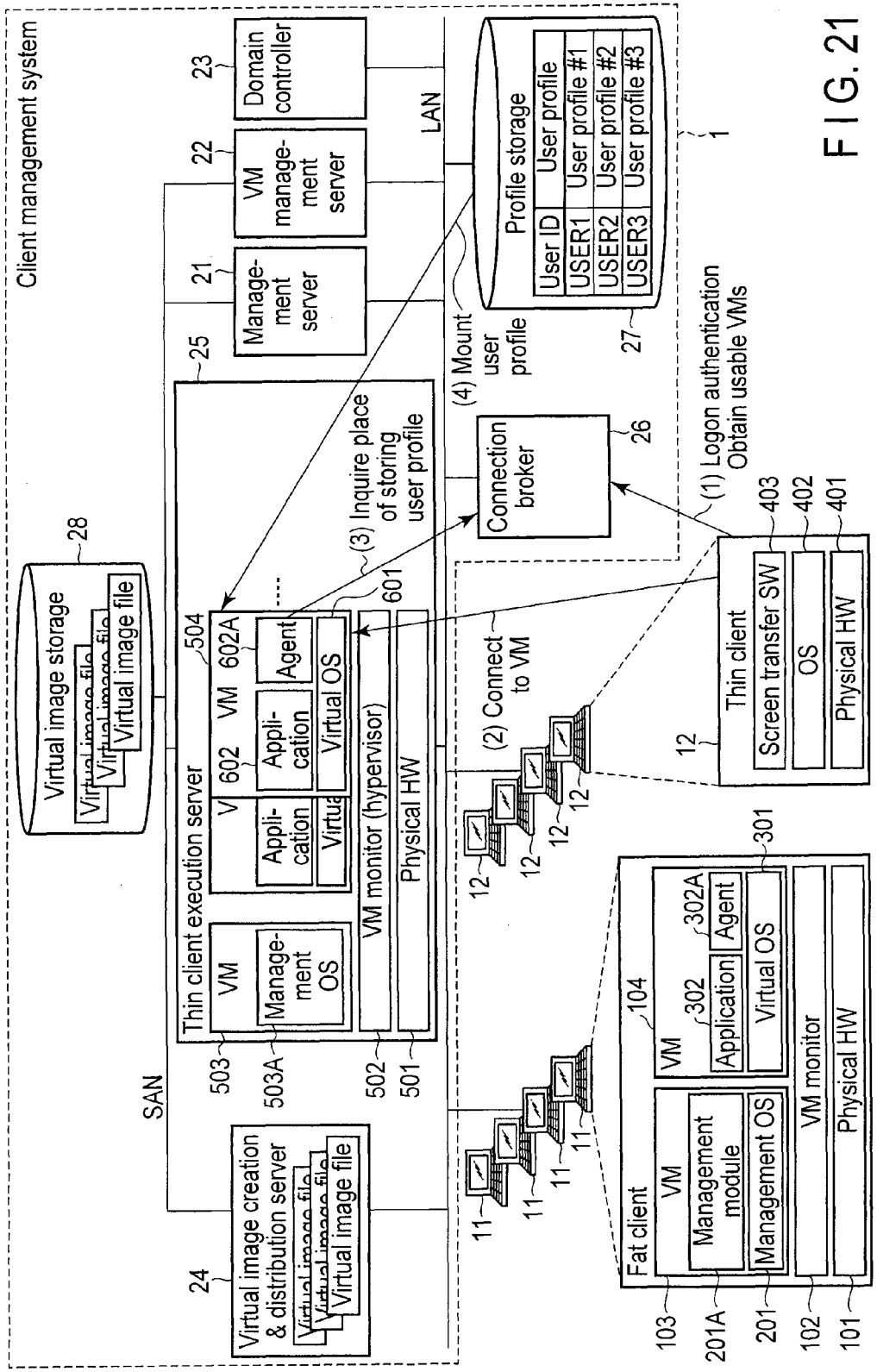
FIG. 21 is an exemplary diagram for explaining an example of a communication process between the client management system and a thin client terminal in FIG. 1.

FIG. 21 is a diagram illustrating the operation sequence of communication between the client management system and the thin client terminal 12. FIG. 22 is a flowchart illustrating a process of logon and logoff/shutdown of the thin client terminal.

The user accesses the connection broker 26 by a web browser which is installed in the thin client terminal 12.

Figure 23:
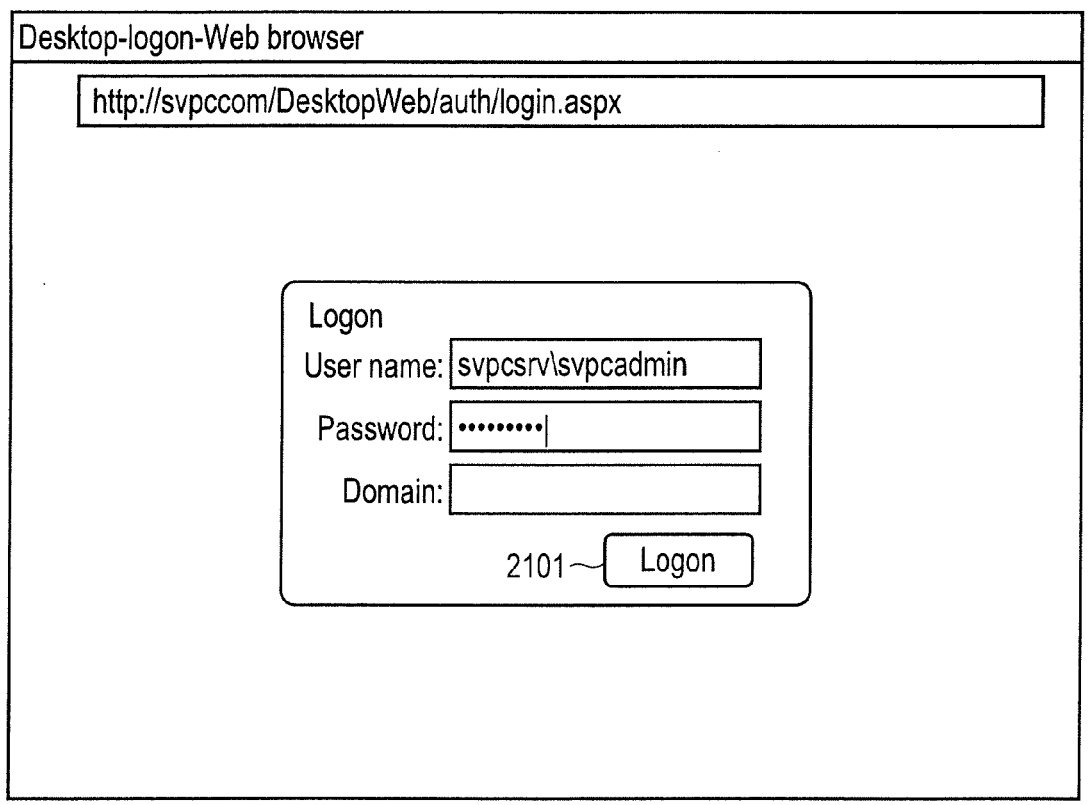
FIG. 23 is an exemplary diagram illustrating a login screen displayed when the terminal is connected to the connection broker.

FIG. 23 is a diagram illustrating a login screen which is displayed when the thin client terminal 12 is connected to the connection broker. As illustrated in FIG. 23, the web browser displays a login screen which includes columns for inputting the user name (user account), the password, and the domain. The user inputs the user account and the password to the columns for inputting the user name (user account), the password, and the domain, and attempts logon (Step B81). When the user operates a logon button 2101, the user name, the password, and the domain which are inputted to the respective input columns are transmitted to the connection broker 26.

The connection broker 26 performs logon authentication by using the transmitted user name and password (Step B82). When the user is authenticated, the connection broker 26 transmits a list of virtual machines on the thin client execution server 25, which the thin client terminal 12 can use.

FIG. 24 is a diagram illustrating a virtual machine selection screen which is displayed when authentication with the connection broker succeeds. For example, the connection broker 26 can transmit a screen as illustrated in FIG. 24, to display a list of virtual machines which can execute a desktop environment corresponding to the user, based on the user ID included in the inquiry, to the thin client terminal 12. The thin client terminal 12 displays a list of usable virtual machines for the user (Step B83). The user selects a virtual machine to be used from the list (Step B84).

The connection broker 26 connects to a virtual machine 504 which is selected from the list of the virtual machines, and starts the connected virtual machine 504 (Step B85). Then, a virtual OS 601 in the virtual machine 504 is started.

Figure 25:
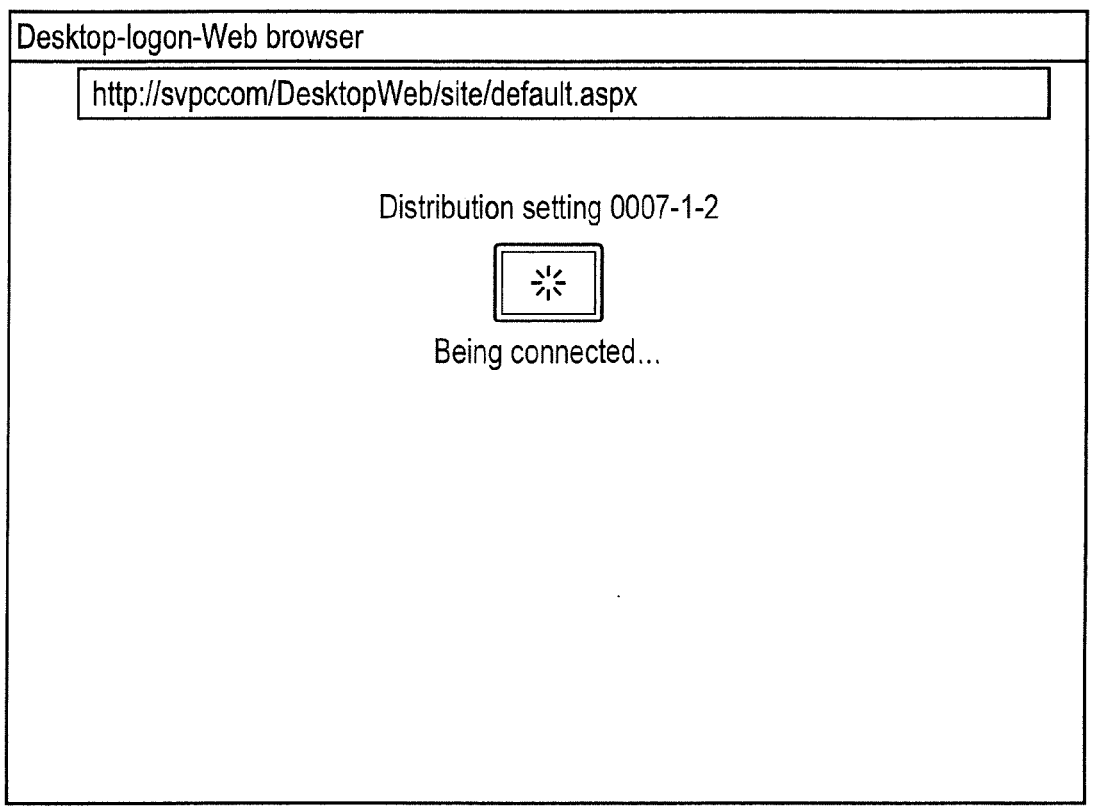
FIG. 25 is an exemplary diagram illustrating a screen which is displayed after a virtual machine is selected.

FIG. 25 is a diagram illustrating a screen which is displayed after the virtual machine is selected. As illustrated in FIG. 25, when the terminal is being connected to the virtual machine 504, a screen which indicates that the terminal is being connected to the virtual machine is displayed. (3) The thin client agent performs logon authentication by using the user account and the password which have been inputted at Step B81 (Step B86). When logon authentication succeeds, the virtual machine 504 (agent 602A) transmits a connection request to the connection broker 26, and inquires the place of storing the user profile which corresponds to the user who has performed the logon operation from the connection broker 26 (Step B87). The connection request is a request to connect (logon) the thin client terminal 12 to the system 1, and includes the user account (user ID) of the user who has performed the logon operation. The connection broker 26 determines whether the transmitted user account exists in the user management database file 1511. When it is determined that the transmitted user account does not exists in the user management database file 1511, the connection broker 26 notifies the thin client agent 602A of it. When the user account exists in the database file, the connection broker 26 determines whether the user profile for the user account is being used, based on the user management database file 1511. When it is determined that the user profile is not being used, the connection broker 26 notifies the virtual machine 504 (agent 602A) of information which indicates a path to the storage place in the profile storage 27, which stores the user profile that is correlated with the user ID of the user, that is, a storage path, and that the user profile is not being used.

When it is determined that the user profile is being used, the connection broker 26 notifies the agent 602A of the storage path and that the user profile is being used. When the agent 602A is notified that the user profile is being used, the thin client agent 602A inquires of the user whether to coercively connect to the disk image file (Step B89). When the user selects coercive connection, the thin client agent 602A requests coercive connection to the disk image file from the connection broker 26, and waits until the terminal which is using the disk image file is disconnected from the disk image file (Step B90). The connection broker 26 requests the terminal which is using the disk image file to be disconnected from the disk image file (Step B91).

(4) When it is notified that the user profile is not being used or the user profile which is being used is unmounted, the virtual machine 504 (agent 602A) mounts the above user profile in the profile storage 27 on the file system of the virtual machine 504 (virtual OS 601) (Step B92). Thereafter, the virtual machine 504 accesses the storage place in the profile storage 27, not the local storage of the thin client execution server 25, to perform reading and writing from and in the user profile.

When mount succeeded, the thin client agent 602A notifies the connection broker 26 of the user account and logon (Step B93). The connection broker 26 changes the usage state for the user account in the user management database file 511 to "being used". The virtual OS 601 performs user authentication in cooperation with the domain controller 23 (Step B94). When logon succeeds, the user uses the virtual machine in the same manner as an ordinary personal computer (PC) (Step B95).

When the user requests logoff or shutdown (Step B96), or the connection broker 26 requests logoff or shutdown (Step B97), the thin client agent 602A unmounts the disk image file which stores the profile (Step B98). The thin client agent 602A notifies the connection broker 26 of the user account and logoff (Step B99). The connection broker changes the usage state for the user account in the user management database file 1511 to "Not used". After the notification, the thin client agent 602A performs logoff or shutdown (Step B100).

<Virtual Image File Creation>

Next, creation of virtual image files will be explained hereinafter.

<From Creation of Master Image File to Creation of Reset Image File>

Figure 26:
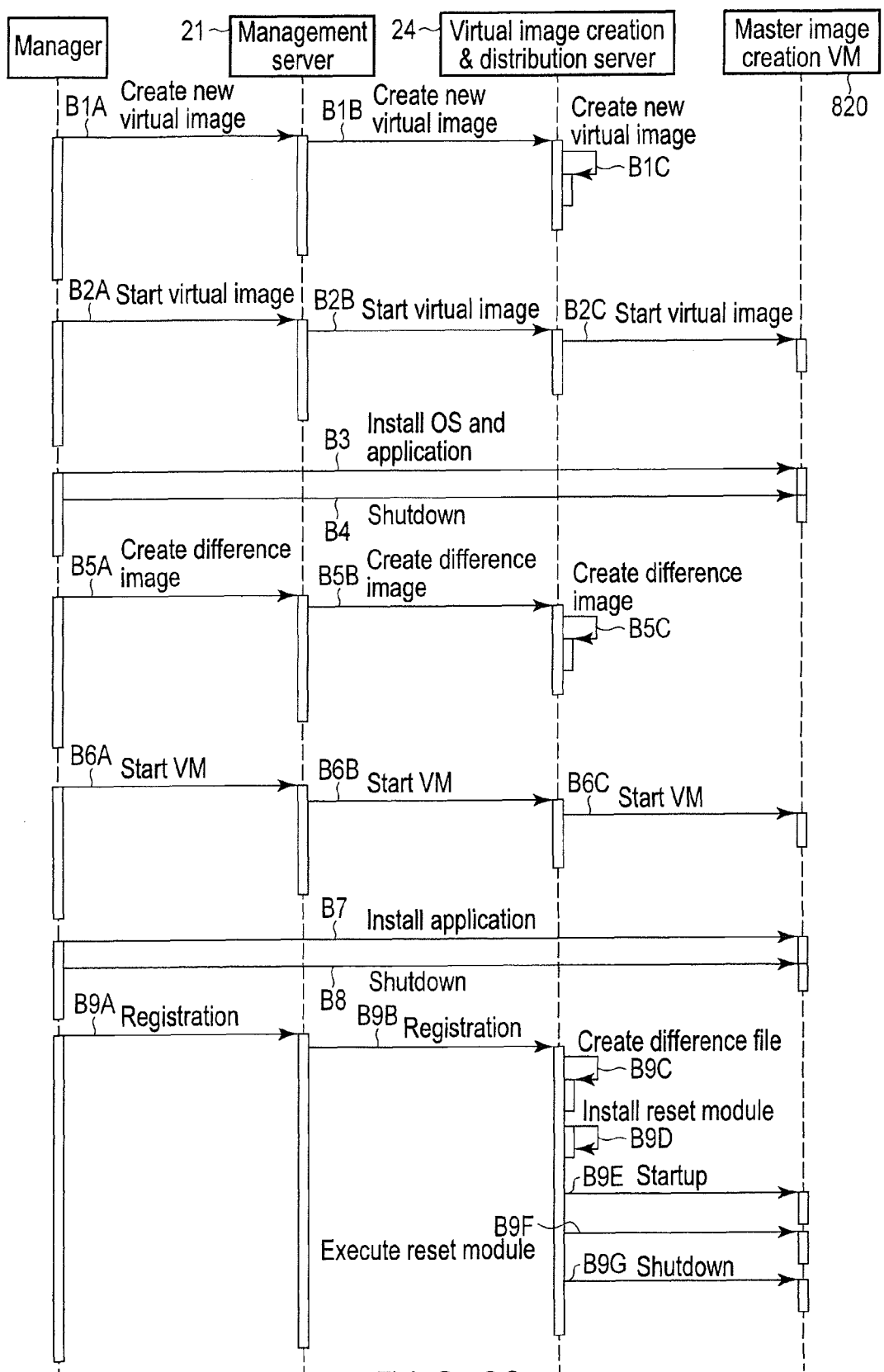
FIG. 26 is an exemplary flowchart illustrating a process from creation of a master image file to creation of a reset image file.

FIG. 26 is a flowchart for explaining process from creation of the master image file to creation of the reset image file. An example of creating a master image file for group ID "G1" illustrated in FIG. 6 will be explained hereinafter.

First, the manager accesses the web interface 705 of the management server 21 by using the web browser of the manager terminal 13. The web browser obtains HTML data from the web interface 705, and displays a webpage for setting the system.

Figure 27:
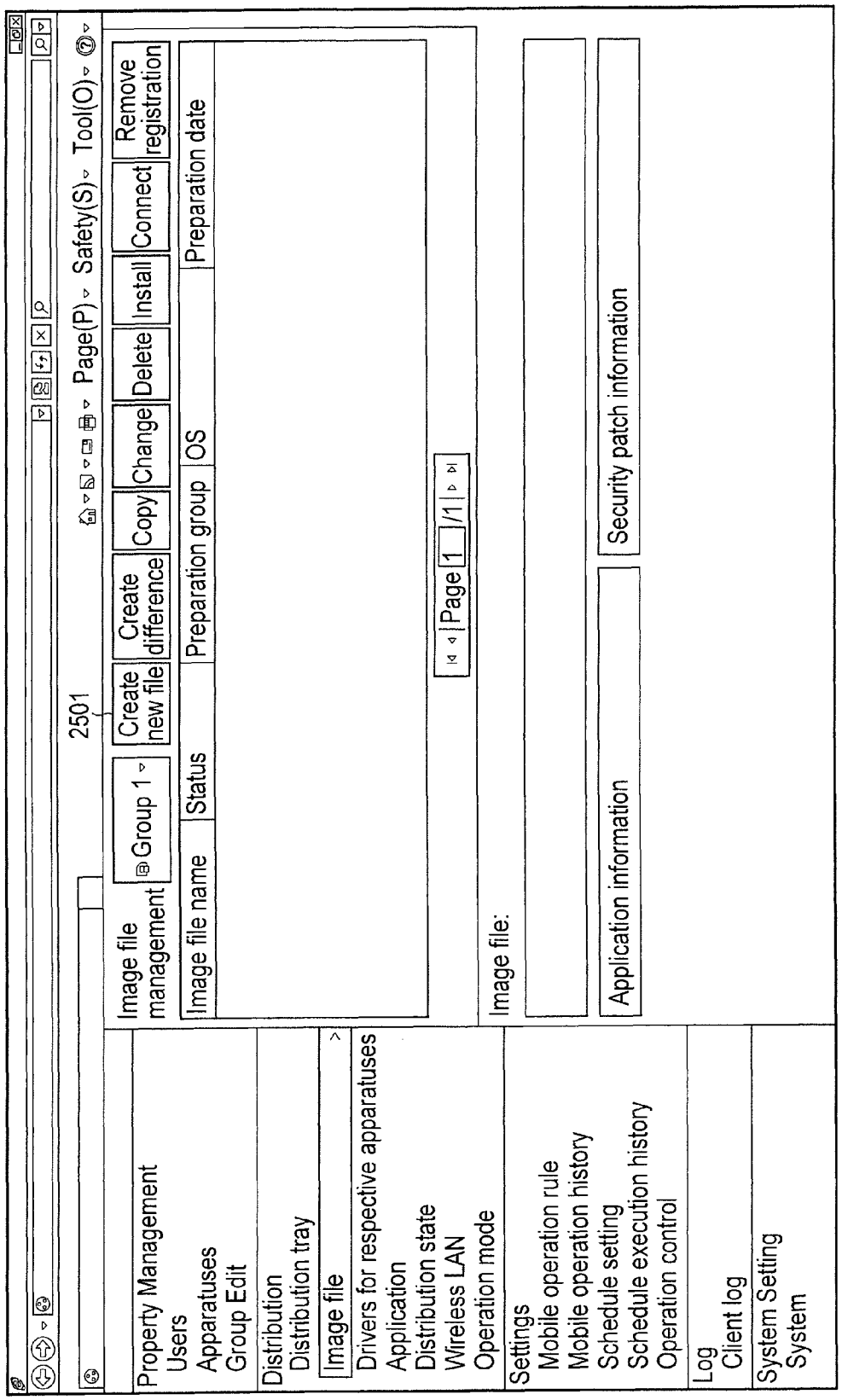
FIG. 27 is an exemplary diagram illustrating an image file management screen which is displayed by a web browser.

FIG. 27 is a diagram illustrating an image file creation screen displayed by the web browser. The manager operates an image file in the webpage, and causes the web browser to display the image file creation screen.

Figure 28:
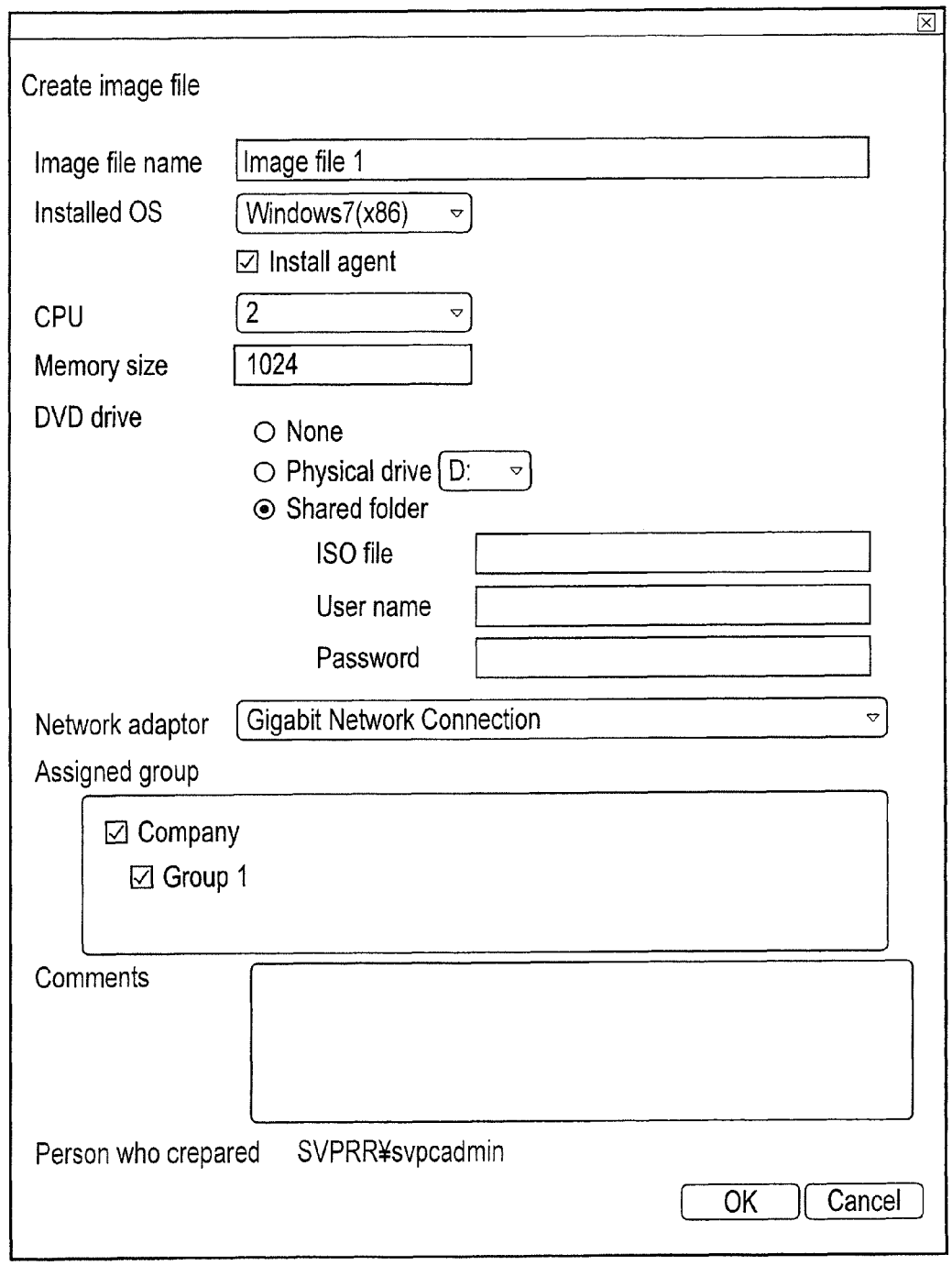
FIG. 28 is an exemplary diagram illustrating a new image file creation screen which is displayed by the web browser.

FIG. 28 is a diagram illustrating a new image file creation screen which is displayed by the web browser. When the manager operates a new creation button 2501 in the image file setting screen of FIG. 27, the web browser displays the new image file creation screen illustrated in FIG. 28.

The new image file creation screen is provided with items "image file name", "installed OS", "CPU", "memory size", "DVD drive", "network adaptor", "assigned group", and "comments". The item "image file name" is provided to set a name of the created virtual image file. The item "installed OS" is provided to set an operating system which is installed in the virtual image file. In the example of FIG. 28, Windows 7(x86) is set as the installed OS. In addition, a check box to set whether the agent is installed or not is provided. The item "CPU" is provided to set the number of cores of the CPU. The item "memory size" is provided to set the size (MB) of the memory used by the virtual machine when the virtual machine is executed. The item "DVD drive" is provided to set the DVD drive. The item "DVD drive" includes choices "None", "Physical drive (select drive letter)", and "Shared folder". When the manager selects the choice "Shared folder", the manager inputs the path of the ISO file, and the user name and the password to access the ISO file. The item "network adaptor" is provided to set a virtual network adaptor in the virtual machine. The item "assigned group" indicates a group which the created image file can belong to.

After setting is performed, when the manager clicks an OK button, the setting is transmitted to the management server 21, and new creation of a virtual image file is requested of the management server (Step B1A). When the management server 21 is requested to create a new virtual image file, the management server 21 transmits the received setting to the virtual image creation & distribution server 24, and requests the virtual image creation & distribution server 24 to create a new virtual image file (Step B1B). The virtual image creation & distribution server 24 creates a new virtual image file based on the setting (Step B1C).

Figure 29:
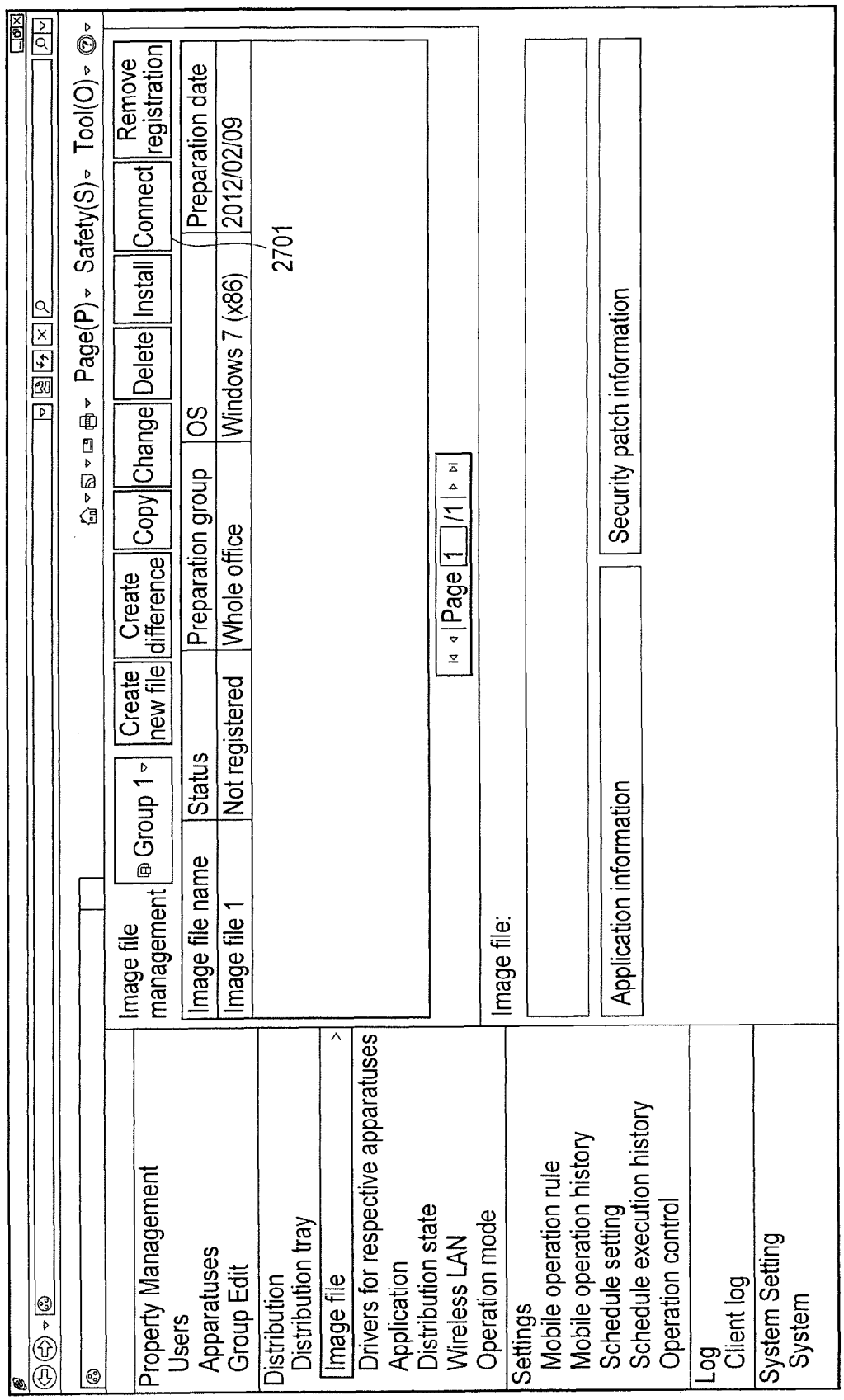
FIG. 29 is an exemplary diagram illustrating an image file management screen which is displayed by the web browser.

When the virtual image creation & distribution server 24 creates a new image file, the web browser which is executed by the manager terminal 13 displays an image file creation screen as illustrated in FIG. 29.

FIG. 29 is a diagram illustrating an image management screen which is displayed by the web browser. The image file creation screen illustrated in FIG. 29 includes a newly created image file 1. Although the status of the image file 1 is displayed as "not registered" in the screen, the image file corresponds to the master image file in FIG. 8.

Figure 30:
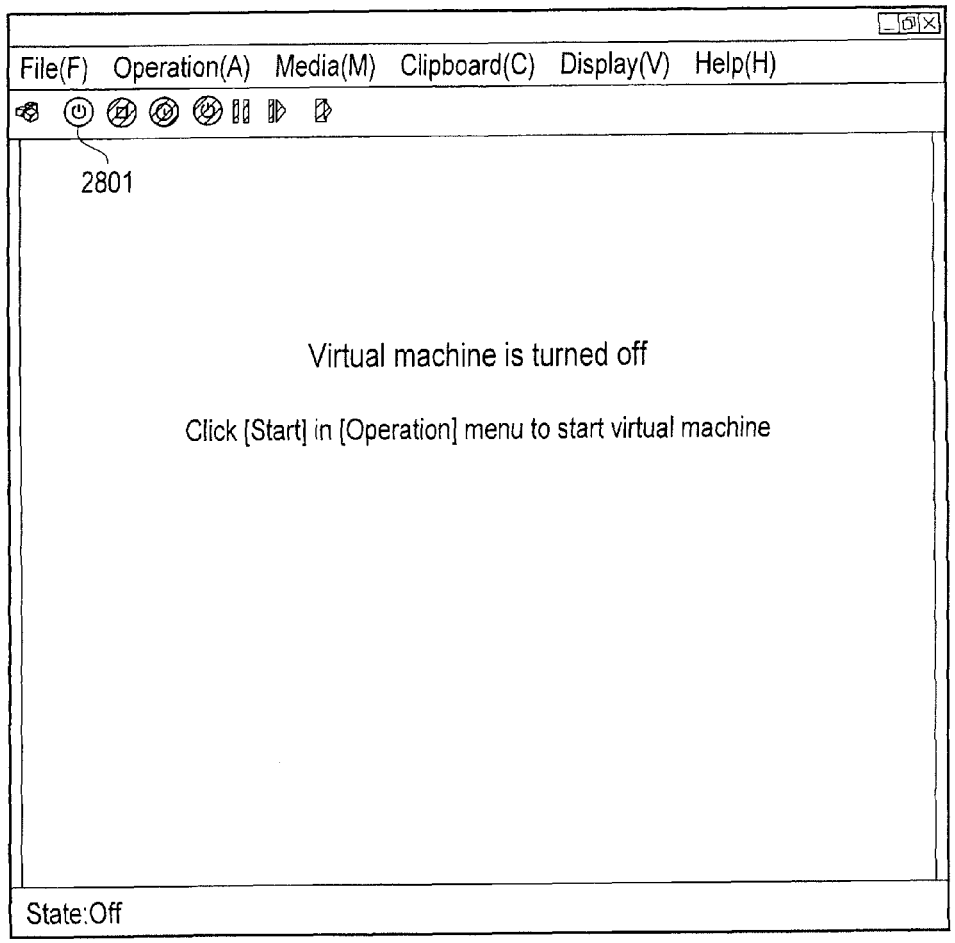
FIG. 30 is an exemplary diagram illustrating a display screen which is displayed when a virtual image file is selected and a connection button is operated.

FIG. 30 is a diagram illustrating a screen which is displayed when the virtual image file is selected and a connection button 2701 is operated. When the manager operates the connection button 2701 in FIG. 29, the screen illustrated in FIG. 30 is displayed. When the manager clicks a power button 2801, the management server 21 is requested to connect the created virtual image file (Step B2A).

Figure 31:
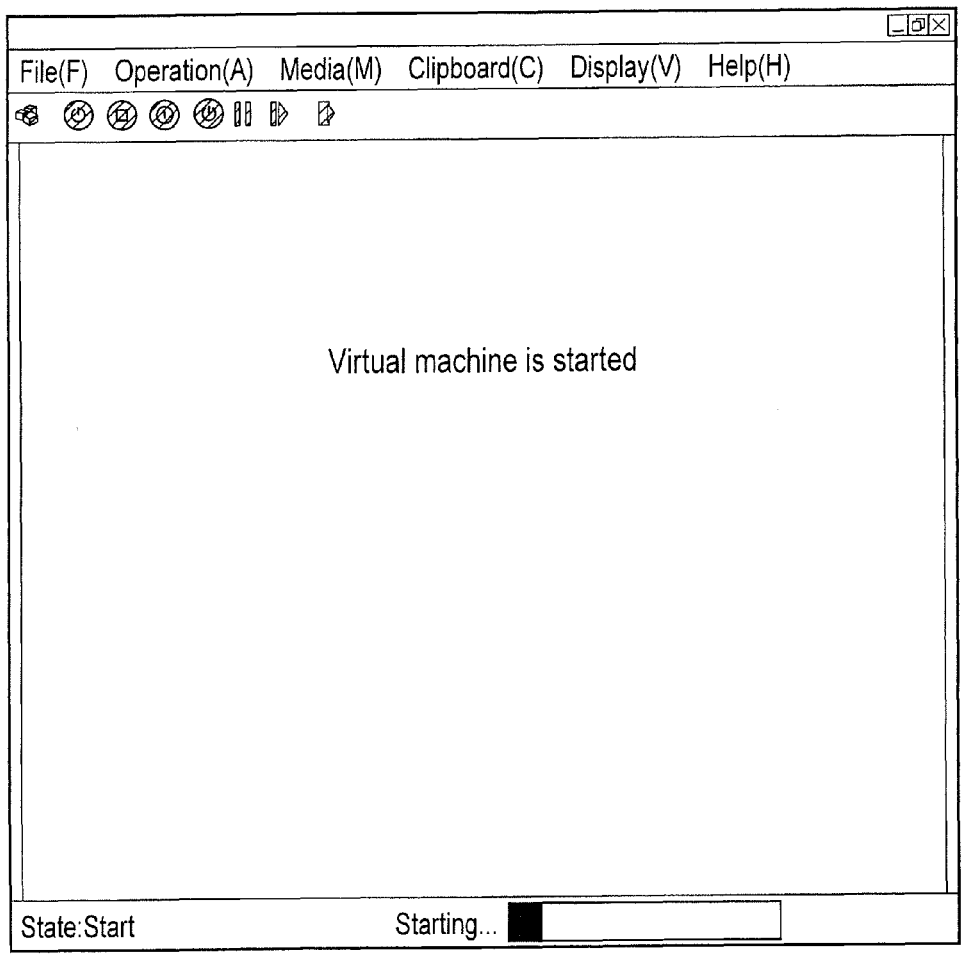
FIG. 31 is an exemplary diagram illustrating a display screen which is displayed when a power button in FIG. 28 is operated.

FIG. 31 is a diagram illustrating a display screen which is displayed when the power button in FIG. 30 is operated.

While the virtual machine is being started up, the screen illustrated in FIG. 31 is displayed. In response to the request, the management server 21 requests the virtual image creation & distribution server 24 to start the virtual image file (Step B2B). The virtual image creation & distribution server 24 starts a master image creation virtual machine 820 by using the virtual image file (Step B2C).

The manager starts an operating system from the DVD which is set in the image creation screen, and installs the operating system in the master image creation virtual machine 820 (Step B3).

Figure 32:
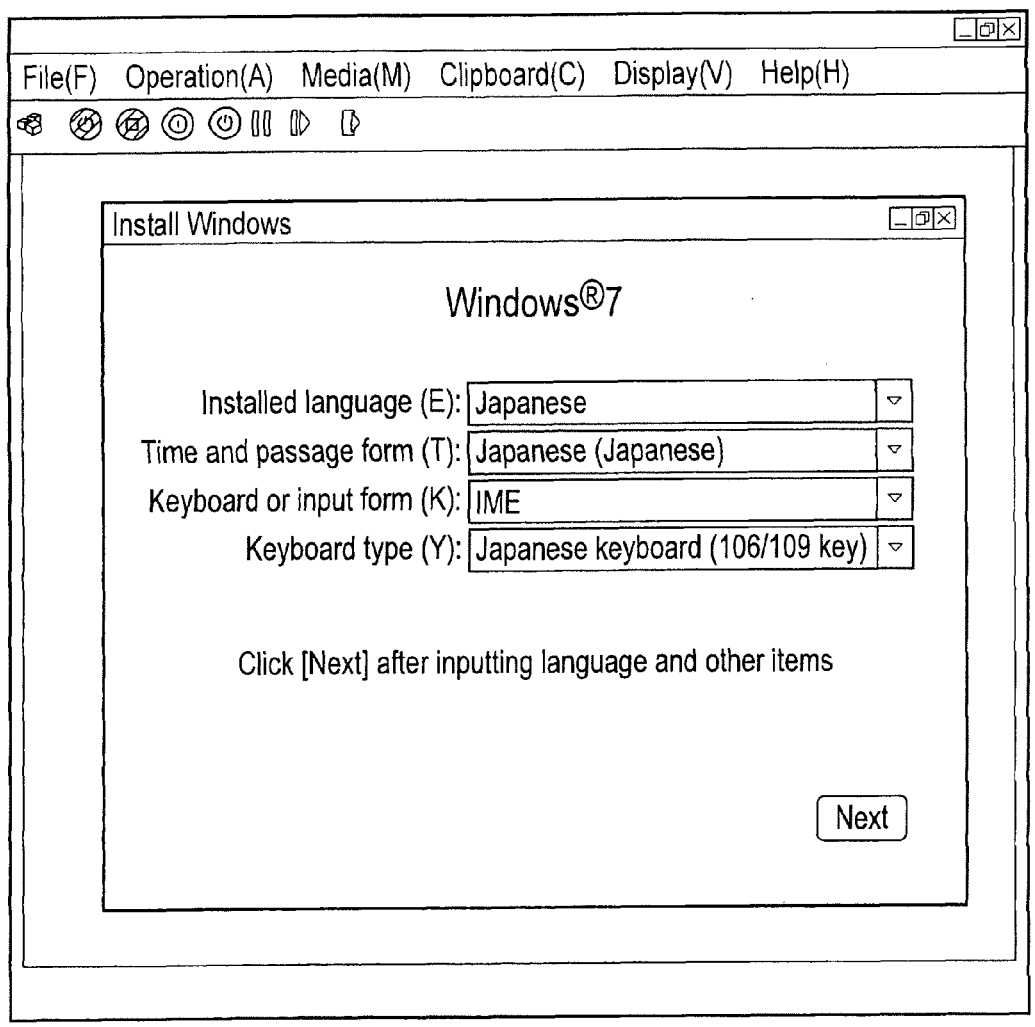
FIG. 32 is an exemplary diagram illustrating a display screen which is displayed when an operating system is installed.

FIG. 32 is a diagram illustrating a display screen which is displayed when the operating system is installed. When there is any application which is used by groups, the application may be installed at this step. When installation is completed, the manager shuts down the master image creation virtual machine 820 (Step B4).

After the manager operates a difference creation button and selects the image file 1, the manager requests the management server 21 to create a difference image file (virtual image file I3) (Step B5A). In response to the request, the management server 21 requests the virtual image creation & distribution server 24 to create a difference image file (virtual image file I3) for the image file 1 (Step B5B). In response to the request, the virtual image creation & distribution server 24 creates a difference image file (virtual image file I3) for the image 11 (Step B5C).

The manager requests the management server 21 to start the virtual machine using virtual image file I3 (Step B6A). The management server 21 requests the virtual image creation & distribution server 24 to start the virtual machine using virtual image file I3 (Step B6B). The virtual image creation & distribution server 24 starts the virtual machine by using virtual image file I3 (Step B6C). The manager installs the application which is used in Group 1 in the virtual machine (Step B7). After installation, the manager shuts down the virtual machine (Step B8).

When the manager operates a registration button (Step B9A), the virtual image file management module 704 of the management server 21 registers virtual image file I3 on the virtual image file management database file 714.

FIG. 33 is a diagram illustrating an image management screen after the virtual image file is registered. As illustrated in FIG. 33, the status of the image file 1 is changed from "not registered" to "registered".

Figure 34:
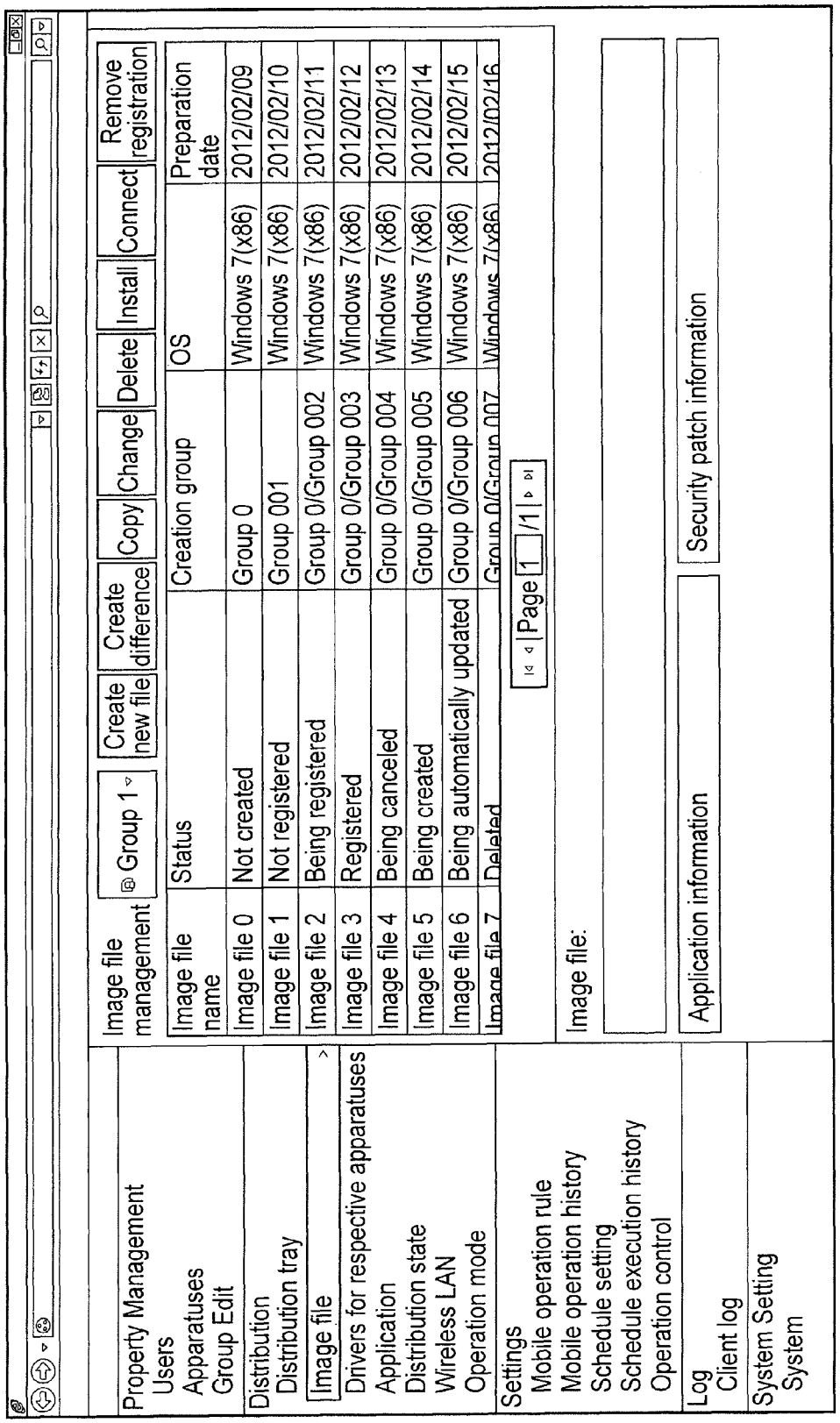
FIG. 34 is an exemplary diagram illustrating an example of the image file management screen to which groups are added.

FIG. 34 is a diagram illustrating an example of an image file management screen in which images are added. FIG. 34 illustrates an example of an image file management screen in which images are added.

Then, the virtual image file management module 704 requests the virtual image creation & distribution server 24 to register virtual image file I3 (Step B9B). The virtual image creation & distribution server 24 creates a virtual image file I4 as a difference disk for virtual image file I3 (Step B9C).

The virtual image creation & distribution server 24 installs a reset module to reset peculiar information for virtual image file I4 (Step B9D). The term "reset module" indicates a parameter file to perform reset of the peculiar information, and a program which is executed in mini-setup (initialization which is executed in first startup after reset). Then, the virtual image creation & distribution server 24 starts the virtual machine by using virtual image file I4 (Step B9E). After startup, the virtual image creation & distribution server 24 executes the reset module, and performs reset of the peculiar information (Step B9F). After reset, the virtual image creation & distribution server 24 shuts down the virtual machine (Step B9G).

<Group Setting and Registration of Virtual Image File>

Next, a process of setting virtual image file I4 for the group G1 will be explained hereinafter.

FIG. 35 is a flowchart for explaining a process of setting virtual image file I4 for the group G1.

First, the manager accesses the web interface 705 of the management server 21 by using the web browser which is executed by the manager terminal 13. The web browser obtains HTML data from the web interface 705, and displays a group edit screen.

Figure 36:
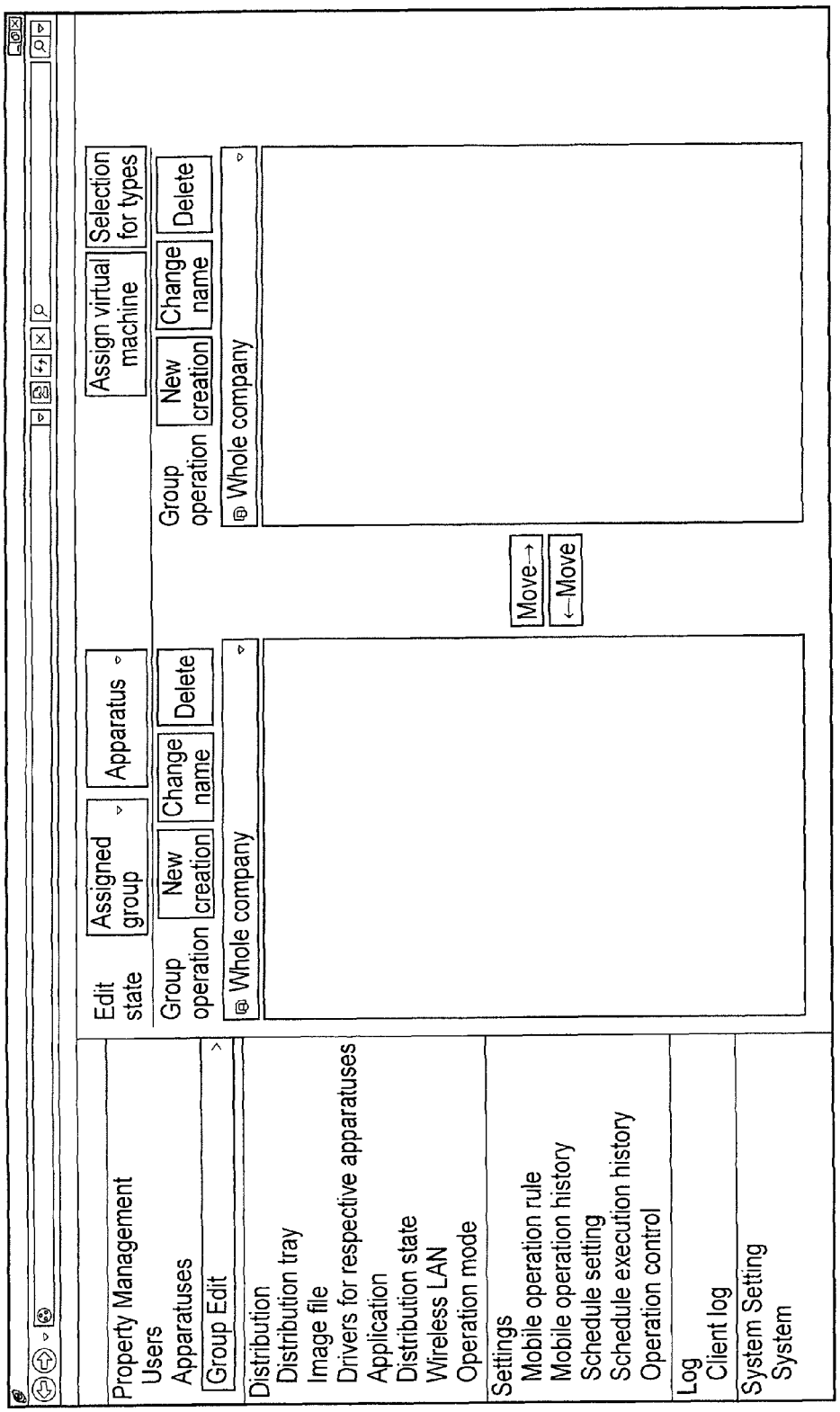
FIG. 36 is an exemplary diagram illustrating a group edit screen which is displayed by the web browser.

FIG. 36 illustrates a diagram illustrating a group edit screen displayed by the web browser. The manager clicks a new creation button in the FIG. 36. When the new creation button is clicked, a group addition screen is displayed.

Figure 37:
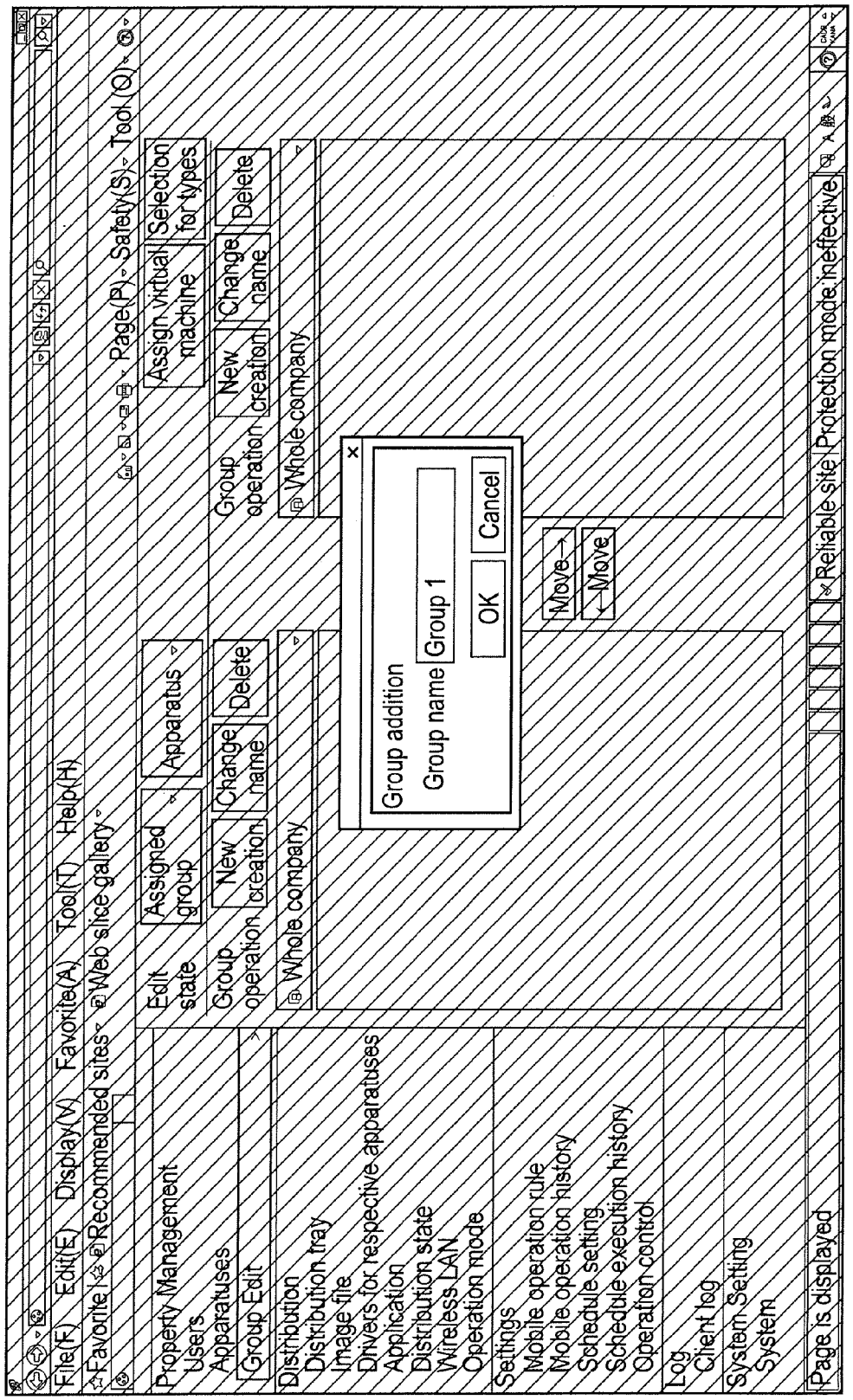
FIG. 37 is an exemplary diagram illustrating a group addition screen which is displayed by the web browser.

FIG. 37 is a diagram illustrating the group addition screen which is displayed by the web browser. After the manager inputs group G1 as the group name, the manager clicks an OK button, and requests the management server 21 to create group G1 (Group name: Group1) (Step B11). The group management module 703 of the management server 21 registers the group G1 (Group name: Group1) on the group management database file 713.

FIG. 38 is a diagram illustrating the group edit screen after group registration. When the group edit screen is displayed after registration, the group has been added as illustrated in FIG. 38. The group management module 703 of the management server 21 registers virtual image file I4 as the virtual image file for the group G1 (Group name: Group1) on the group management database file 713 (FIG. 6). Thereafter, the group management module 703 selects "user" as the object to be edited, and adds the user to the new group.

Figure 39:
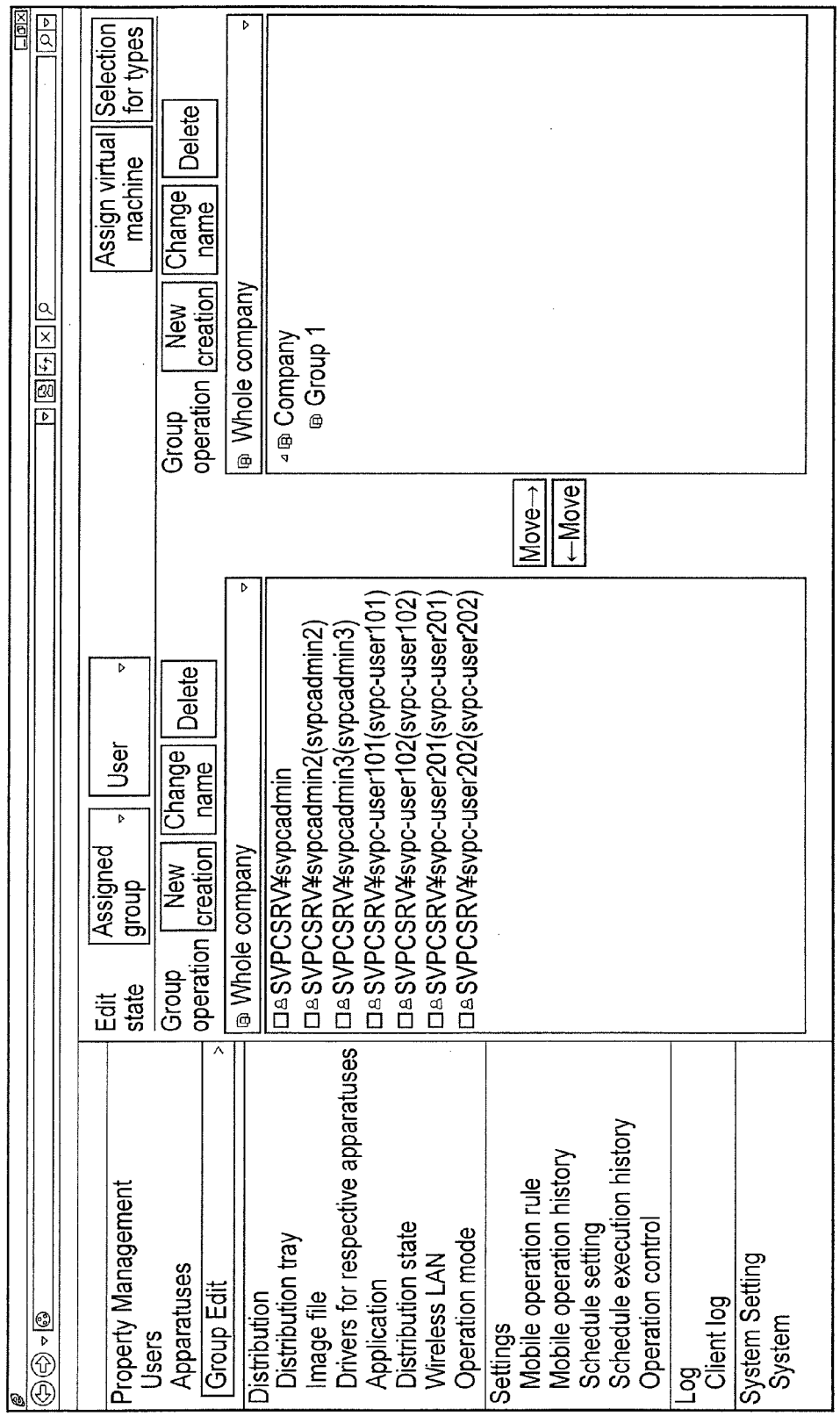
FIG. 39 is an exemplary diagram for explaining registration of user accounts for groups.
Figure 41:
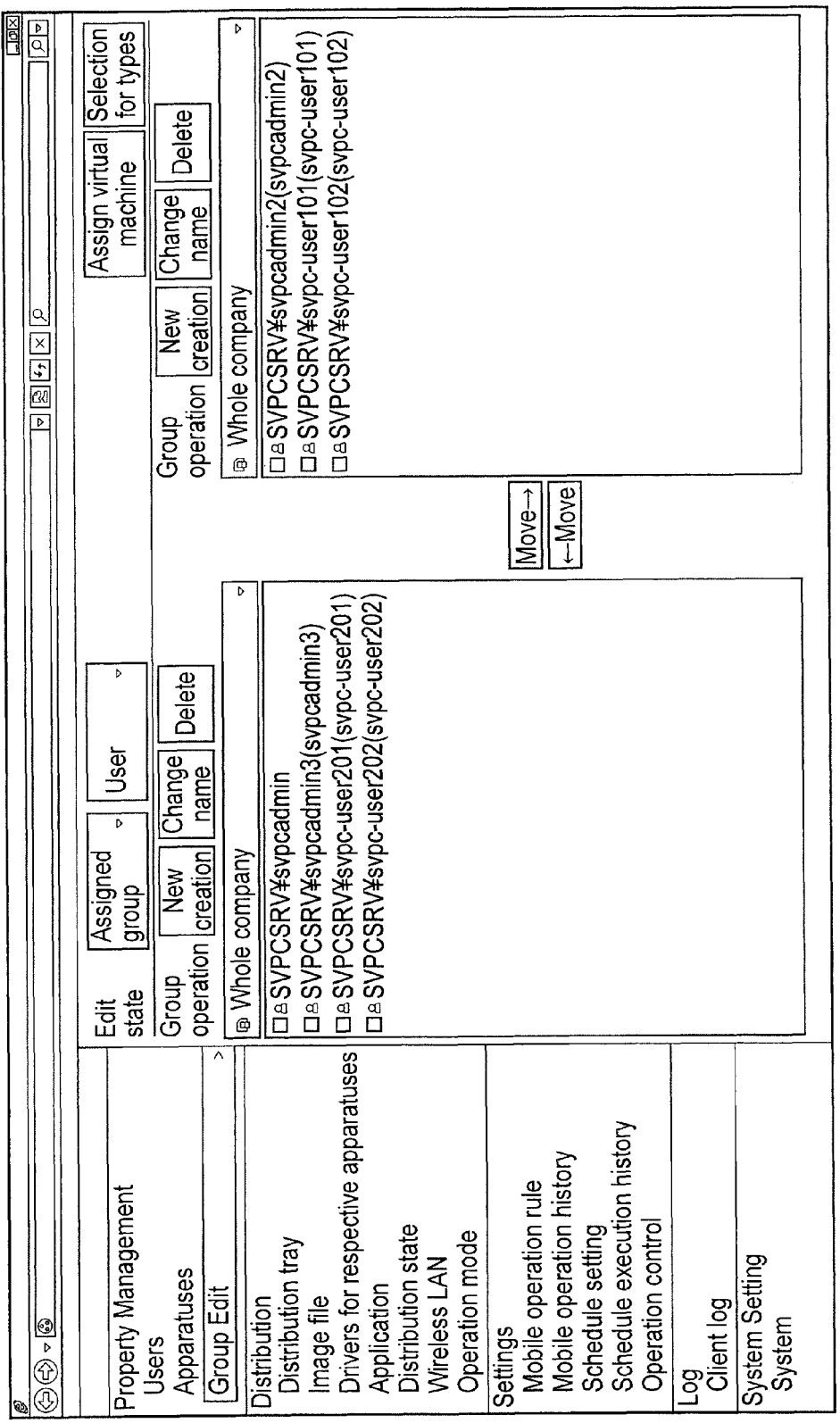
FIG. 41 is an exemplary diagram for explaining registration of user accounts for groups.

FIG. 39, FIG. 40, and FIG. 41 are diagrams for explaining registration of user accounts for the group. The manager requests the management server 21 to register the group G1 as the group which a user (user account: Domain1/user1) belongs to (Step B12). The user management module 702 of the management server 21 registers the user account (Domain1/user1) and the belonging group ID (G1) on the user management database file 712 (FIG. 5).

Thereafter, the manager requests the management server 21 to register the fat client terminal (apparatus ID: M1, computer name: Computer1#, type name: Hatsushiba notebook RX1, assigned group ID: G1) (Step B13). The client management module 701 of the management server 21 registers the apparatus ID (M1), the computer name (Computer1#), the type name (Hatsushiba notebook RX1), the assigned group ID (G1), and the client type (fat client terminal) on the client management database file 711 (FIG. 4).

As the screen, the item "User" in the edit state of FIG. 39, FIG. 40, and FIG. 41 is changed to "Apparatus".

Then, the manager requests the management server 21 to register the thin client terminal (apparatus ID: M3, computer name: Computer3, assigned group ID: G1) (Step B14). The client management module 701 of the management server 21 registers the apparatus ID (M3), the computer name (Computer3), the assigned group ID (G1), and the client type (thin client terminal) on the client management database file 711 (FIG. 4). Thereby, the management server 21 transmits an individual image creation request as follows to the virtual image creation & distribution server 24. Specifically, the request is transmitted to request to the virtual image creation & distribution server 24 to create an individual image file for the group G1 by using virtual image file I4.

When the above processing is completed, the manager causes the web browser which is executed by the manager terminal 13 to display a distribution tray screen.

FIG. 42 is a diagram illustrating the distribution tray screen which is displayed by the web browser. A new creation button 4001 in the distribution tray screen is clicked. In response to clicking of the new creation button 4001, the web browser displays an image file selection screen.

FIG. 43 is a diagram illustrating the image file selection screen which is displayed by the web browser. The manager selects an image file to be distributed from image files in the image file selection screen, and select a group to which the image file is to be distributed. The setting which is inputted to the image file selection screen is transmitted to the management server 21 (Step B15).

<Creation of Individual Image File for Fat Client Terminal>

Next, a process of creating an individual file for the fat client terminal will be explained hereinafter.

FIG. 44 is a flowchart illustrating a process of creating an individual image file for the fat client terminal. The manager transmits setting for creating an individual virtual image file to the management server 21 (Step B21). This step corresponds to clicking "distribute immediately" or "reserve distribution" button in FIG. 43.

The client management module 701 retrieves apparatuses which belong to the group G1 from the client management database file 711, and obtains information of the apparatuses which belong to the group G1. In the case of the client management database file 711 illustrated in FIG. 4, information of the fat client terminal M1 and the thin client terminal M3 is obtained.

The management server requests the virtual image creation & distribution server 24 to create a difference disk I5 for the fat client terminal M1 from virtual image file I4 (Step B22). The virtual image creation & distribution server 24 creates a difference disk I5 from virtual image file I4, in response to the request (Step B23). Since terminal M1 is a fat client terminal, the virtual image creation & distribution server 24 installs the fat client agent in terminal M1 (Step B24).

The virtual image creation & distribution server 24 starts the virtual machine 830 by using virtual image file I5 (Step B25). After startup, the individual image creation virtual machine 830 executes mini-setup (Step B26). The mini-setup is automatically executed in startup after reset of peculiar information by the reset module. The individual image creation virtual machine 830 changes the computer name to "Computer10" by the mini-setup (Step B27). Then, the individual image creation virtual machine 830 performs domain participation (Step B28). After the virtual machine participates in the domain, the individual image creation virtual machine 830 reports to the virtual image creation & distribution server 24 that the virtual machine has participated in the domain (Step B29). Then, the virtual image creation & distribution server 24 shuts down the individual image creation virtual machine 830 (Step B30).

FIG. 45 is a flowchart illustrating a process of inquiring by the fat client terminal of the management server whether there are new virtual image files or not. As illustrated in FIG. 45, the fat client terminal 11 inquires of the management server 21 whether there is any new virtual image file or not, in startup and periodically after startup (Step B51 and Step B54).

When there is a new image file, the management server 21 returns a list of the virtual image files to the fat client terminal 11. In the case of the fat client terminal M1, a list which includes virtual image files I1, I3, I4, and I5 is returned. When the list includes any image file ID which the fat client terminal M1 does not include, the fat client terminal M1 requests the virtual image creation & distribution server 24 to distribute the virtual image file (Step B53). The virtual image creation & distribution server 24 distributes the virtual image file to the fat client terminal M1, in response to the request.

When there is no image file which the fat client terminal M1 does not include, the management server 21 notifies the fat client terminal M1 of it.

The virtual machine management module 201A or the fat client agent 302A downloads the virtual image file.

<Creation of Individual Image File for Thin Client Terminal>

Next, a process of creating an individual image file for the thin client terminal will be explained hereinafter.

Figure 46:
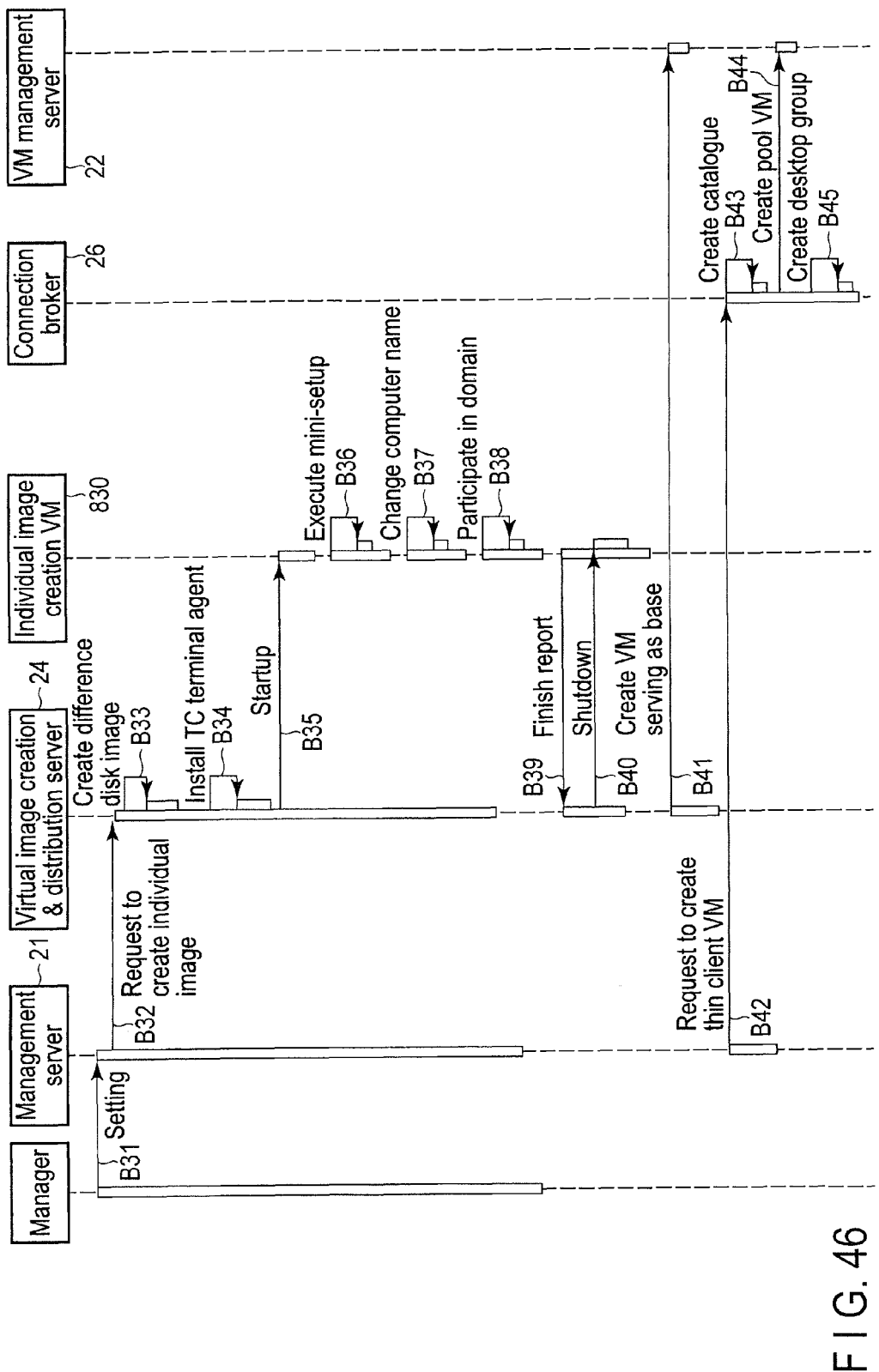
FIG. 46 is an exemplary flowchart illustrating a process of creating an individual image file for the thin client terminal.

FIG. 46 is a flowchart illustrating a process of creating an individual image file for the thin client terminal. In FIG. 46, the manager transmits setting for creating an individual virtual image file to the management server 21 (Step B31). This step corresponds to the clicking "distribute immediately" or "reserve distribution" in FIG. 43.

The client management module 701 retrieves apparatuses which belong to the group G1 from the client management database file 711, and obtains information of the apparatuses which belong to the group G1. In the case of the client management database file 711 illustrated in FIG. 4, information of the fat client terminal M1 and the thin client terminal M3 is obtained.

The management server 21 requests the virtual image creation & distribution server 24 to create a difference disk I6 for the thin client terminal M3 from virtual image file I4 (Step B32). The virtual image creation & distribution server 24 creates a difference disk I6 from virtual image file I4, in response to the request (Step B33). Since terminal M3 is a thin client terminal, the virtual image creation & distribution server 24 installs the thin client (TC) agent in terminal M3 (Step B34). The same agent may be used for the fat clients and the thin clients, and different processing may be performed for the fat clients and the thin clients by internal flags.

The virtual image creation & distribution server 24 starts the individual image creation virtual machine 830 by using virtual image file I6 (Step B35). After startup, the individual image creation virtual machine 830 executes mini-setup (Step B36). The mini-setup is automatically executed in startup after reset of peculiar information by the reset module. The individual image creation virtual machine 830 changes the computer name to "Computer3" by the mini-setup (Step B37). Then, the individual image creation virtual machine 830 performs domain participation (Step B38). After the virtual machine participates in the domain, the individual image creation virtual machine 830 reports to the virtual image creation & distribution server 24 that the virtual machine has participated in the domain (Step B39). Then, the virtual image creation & distribution server 24 shuts down the individual image creation virtual machine 830 (Step B40).

The virtual image creation & distribution server 24 requests the virtual machine management server 22 to create a virtual machine using virtual image files I1, I3, I4, and I6 (Step B41). When there is any difference between the difference disk which is dealt with by the virtual machine management server 22 and the difference disk which is dealt with by the thin client execution server 25, format conversion of the image file is performed.

The management server 21 transmits a list of users who belong to the group G1, which is obtained from the user management database file 712 illustrated in FIG. 5, the number of pools, and information of the virtual machine created in response to the request at Step B41 to the connection broker 26, and requests the connection broker 26 to create a pool and a desktop group (Step B42). The connection broker 26 creates a catalogue based on the information transmitted from the management server 21 (Step B43). The catalogue is a database file for managing the thin client execution server 25 and the virtual machines. The connection broker 26 requests the virtual machine 22 to create a pool virtual machine (poolVM) (Step B44). The connection broker 26 creates a desktop group (Step B45). The desktop group is a database file for managing sets of users and virtual machines assigned to the groups.

<Creation of Virtual Image Files and Distribution of Virtual Image Files>

Next, creation of the virtual image files and distribution of the virtual image files will be explained hereinafter.

Figure 47:
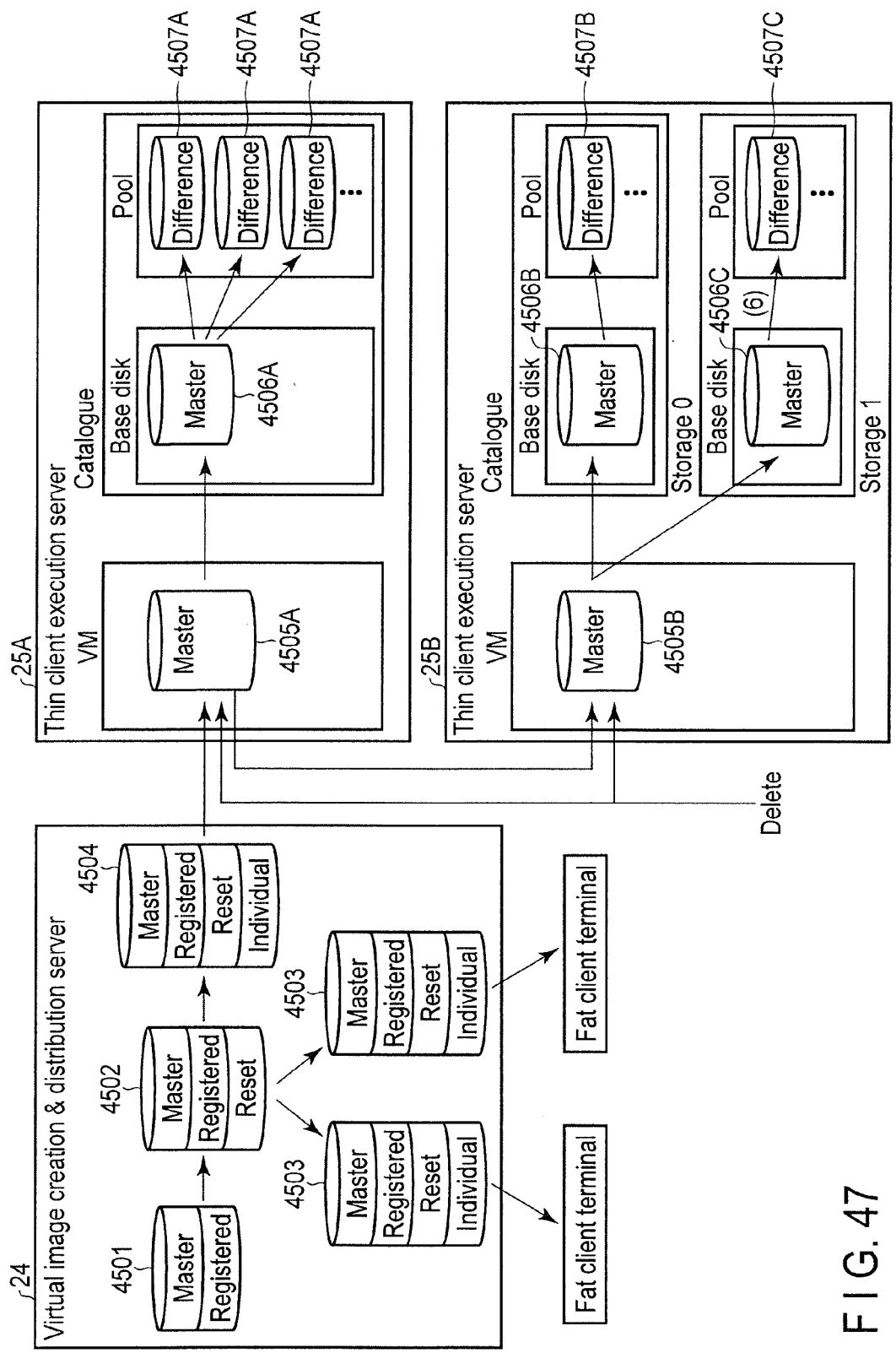
FIG. 47 is an exemplary diagram for explaining creation of the virtual image files and distribution of the virtual image files.

FIG. 47 is a diagram for explaining creation of the virtual image files and distribution of the virtual image files.

A virtual image file 4501 is created by the process from Step B1A to Step B9C (excluding Step B5A to Step B5C) in FIG. 26, and formed of a master image file and a registered image file.

A virtual image file 4502 is created from the virtual image file 4501 by the process of Step B9F, and formed of the master image file, the registered image file, and a reset image file.

A virtual image file 4503 is created from the virtual image file 4502 by the process from Step B21 to Step B30 of FIG. 44, and formed of the master image file, the registered image file, the reset image file, and an individual image file. The fat client terminal 11 executes a virtual machine by the virtual image file 4503.

A virtual image file 4504 is created from the virtual image file 4502 by the process from Step B31 to Step B40 of FIG. 46, and formed of the master image file, a difference image file, the reset image file, and an individual image file.

A virtual image file 4505A is created by Step B41 of FIG. 46. A virtual machine is created in one thin client execution server 25A by the virtual image file 4505A. In this example, image file conversion is also performed. As a result, a file which is formed of four difference disks is changed to one disk image file.

A virtual image file 4505B is created by the connection broker 26, and a copy of the virtual image file 4505A in the thin client execution server 25A. However, the virtual image file 4505B is copied as a virtual machine, not only a copy of a file. Specifically, the disk image file is copied, and the virtual machine setting file thereof is edited to agree with the environment of the thin client execution server 25B.

Virtual image files 4506A to 4506C are image files which are copied as base disks of catalogues for respective storages. Pools 4507A, 4507B, and 4507C for the number of pools received from the management server 21 are created. It is possible to deal with pools of the number which cannot be stored in one storage, by creating virtual machines for respective thin client execution servers 25, and creating catalogues for respective storages.

After the pools are created, the virtual machines 4505A and 4505B in the thin client execution servers 25 are deleted.

<Relation Between Catalogue and Desktop Group>

Next, relation between the catalogue and the desktop group will be explained hereinafter.

Figure 48:
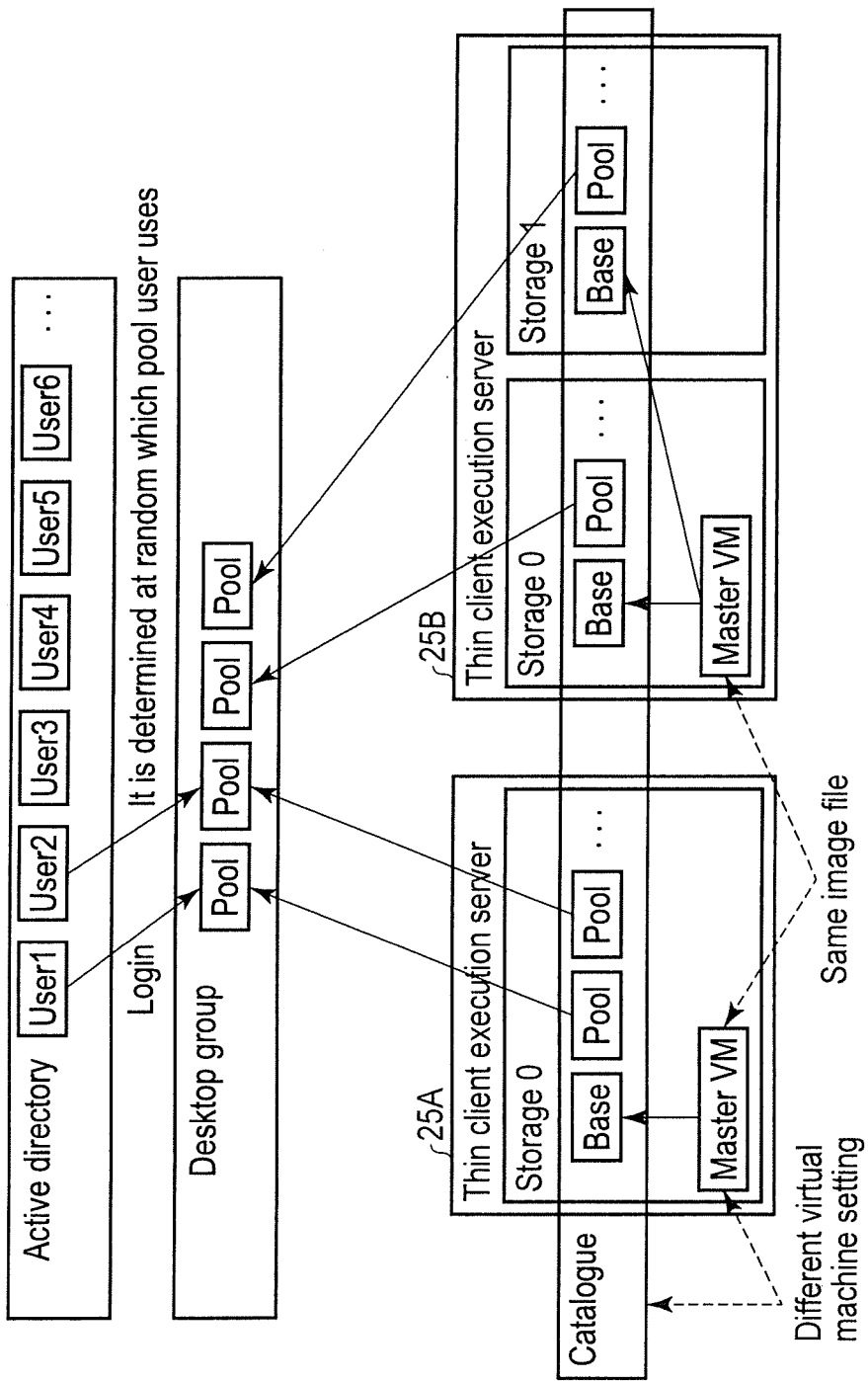
FIG. 48 is an exemplary diagram for explaining relation between a catalogue and a desktop group.

FIG. 48 is a diagram for explaining relation between the catalogue and the desktop group.

After the catalogue is created, the connection broker 26 creates a desktop group based on the user accounts transmitted from the management server 21, the number of pools transmitted from the management server 21, and the catalogue.

According to the present embodiment, it is possible to distribute virtual image files, which include a common OS and application installed by the manager, to not only client virtualization terminals, but also thin client execution servers 25.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A client management system configured to manage client terminals on a network, the client terminals comprising a client virtualization terminal configured to execute a first virtual machine by using a first virtual image file, and thin client terminals, the system comprising:
    a first thin client execution server configured to execute virtual machines configured to communicate with the thin client terminals by using a screen transfer protocol and to execute virtual machines by using a second virtual image file;
    a management server comprising a client management module, a user management module, and a group management module,
        the client management module configured to manage client management information which correlates with client terminal information, group information, and type information, the client terminal information indicating a first client terminal among the client terminals, the group information indicating a group to which the first client terminal belongs, the type information indicating whether the first client terminal is a client virtualization terminal that executes a virtual machine or a thin client terminal,
        the user management module configured to manage user management information which correlates with a user account and the group information, and
        the group management module configured to manage group management information which correlates with the group information and a virtual image file configured to execute a virtual machine; and
    a virtual image file creation server configured to create the first virtual image file and the second virtual image file in parallel based on a third virtual image file.

2. The system of claim 1, further comprising:
a second thin client execution server configured to execute virtual machines to communicate with the thin client terminals by using the screen transfer protocol.

3. The system of claim 1, further comprising:
a profile management module configured to manage user profiles corresponding to respective users by using storage storing the user profiles.

4. A method of managing a client management system which manages client terminals on a network, comprising:
    managing client management information, which correlates with client terminal information that indicates a client terminal, group information that indicates a group to which the client terminal belongs, and type information that indicates whether the client terminal is a client virtualization terminal that executes a virtual machine or a thin client terminal;
    managing user management information, which correlates with a user account with the group information;
    managing group management information, which correlates with the group information with a virtual image file configured to execute a virtual machine; and
    creating a first virtual image file and a second virtual image file in parallel based on a third virtual image file; wherein
        the client terminals include a client virtualization terminal configured to execute a first virtual machine by using the first virtual image file, and thin client terminals, and
        the client management system includes a first thin client execution server which executes virtual machines configured to communicate with the thin client terminals by using a screen transfer protocol and executes the virtual machines by using the second virtual image file.

5. The method of claim 4, wherein
the client management system comprises a second thin client execution server which executes virtual machines to communicate with thin client terminals by using a screen transfer protocol.

6. The method of claim 4, further comprising:
managing user profiles that correspond to respective users, by using a storage that stores the user profiles.

* * * * *